US012647188B2

(12) United States Patent
Namazi et al.

(10) Patent No.: US 12,647,188 B2
(45) Date of Patent: Jun. 2, 2026

(54) SYSTEMS AND METHODS FOR PERFORMING QUANTUM TELECOMMUNICATIONS USING A BICHROMATIC ENTANGLEMENT SOURCE

(71) Applicant: Qunnect, Inc., Brooklyn, NY (US)

(72) Inventors: Mehdi Namazi, Brooklyn, NY (US);
Mael Flament, Brooklyn, NY (US);
Yang Wang, New York, NY (US);
Alexander Craddock, Brooklyn, NY
(US); Rourke Sekelsky, Brooklyn, NY
(US); Anita Richardson, Brooklyn, NY
(US)

(73) Assignee: Qunnect, Inc., Brooklyn, NY (US)

( * ) Notice: Subject to any disclaimer, the term of this
patent is extended or adjusted under 35
U.S.C. 154(b) by 368 days.

(21) Appl. No.: 18/274,865

(22) PCT Filed: Jan. 28, 2022

(86) PCT No.: PCT/US2022/014250
§ 371 (c)(1),
(2) Date: Jul. 28, 2023

(87) PCT Pub. No.: WO2022/165134
PCT Pub. Date: Aug. 4, 2022

(65) Prior Publication Data
US 2024/0129045 A1      Apr. 18, 2024

Related U.S. Application Data

(60) Provisional application No. 63/143,740, filed on Jan.
29, 2021.

(51) Int. Cl.
H04B 10/70       (2013.01)
H04B 10/572      (2013.01)
H04B 10/50       (2013.01)

(52) U.S. Cl.
CPC .......... H04B 10/70 (2013.01); H04B 10/572
(2013.01); *H04B 10/503* (2013.01)

(58) Field of Classification Search
None
See application file for complete search history.

(56) References Cited

U.S. PATENT DOCUMENTS 6,897,434 B1 *   5/2005   Kumar ................... H04B 10/70
                                                   359/341.1
11,784,806 B2 * 10/2023   Figueroa ........... G01B 9/02017
                                                   380/278

(Continued)

FOREIGN PATENT DOCUMENTS

WO      WO 2019/014589 A1     1/2019
WO      WO 2020/072005 A1     4/2020
WO      WO 2020/263616 A1    12/2020

OTHER PUBLICATIONS

Dong-Sheng et al., Slow light via four-wave mixing in a hot
rubidium vapour, 2013 (Year: 2013).*

(Continued)

*Primary Examiner* — Jai M Lee
(74) *Attorney, Agent, or Firm* — Wolf, Greenfield &
Sacks, P.C.

(57)      ABSTRACT

Systems and methods for generating an entangled pair of
bichromatic photons are described. The system includes an
atomic vapor cell containing atoms of an atomic species
located within beam paths of a first and second laser beam.
The first and second laser beams are tuned to first and second
wavelengths that are resonant with first and second atomic
transitions of the atomic species such that the first and
second laser beams cause a four-wave mixing process within
the atomic vapor cell. As a result of the four-wave mixing
process, entangled photon pairs having a third and fourth
wavelength are generated and output from the atomic vapor (Continued)

cell. The first and second wavelengths may be selected to create electromagnetically-induced transparency (EIT) within the atomic vapor cell, the EIT creating a transparent medium within the atomic vapor cell at the third wavelength, improving spectral brightness and/or photon linewidths.

24 Claims, 22 Drawing Sheets

(56)                    References Cited

U.S. PATENT DOCUMENTS

| | | | | |
|---|---|---|---|---|
| 12,184,769 | B2 * | 12/2024 | Figueroa | G01B 9/02017 |
| 2008/0258049 | A1 * | 10/2008 | Kuzmich | G02F 1/33 |
| | | | | 250/214.1 |
| 2013/0308956 | A1 | 11/2013 | Meyers et al. | |
| 2021/0028865 | A1 | 1/2021 | Figueroa et al. | |
| 2023/0412280 | A1 * | 12/2023 | Moon | H04B 10/70 |
| 2025/0097021 | A1 * | 3/2025 | Figueroa | H04L 9/0858 |

OTHER PUBLICATIONS

International Search Report and Written Opinion dated Jun. 29, 2022, in connection with International Application No. PCT/US22/14250.

Invitation to Pay Additional Fees dated Apr. 13, 2022, in connection with International Application No. PCT/US22/14250.

Extended European Search Report dated Nov. 25, 2024, in connection with European Application No. 22746665.3.

Sheng et al. Slow light via four-wave mixing in a hot rubidium vapour. Chinese Physics. Nov. 15, 2013;22(11). 6 Pages.

Zavatta et al., Generation Engineering of Heralded Narrowband Colour Entangled States. Cornell University Library. Sep. 10, 2018. XP020253014. 6 Pages.

* cited by examiner

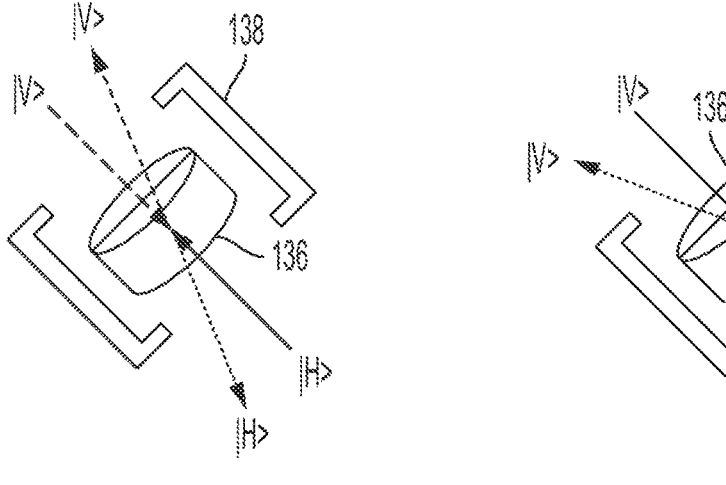
FIG. 2A                    FIG. 2B
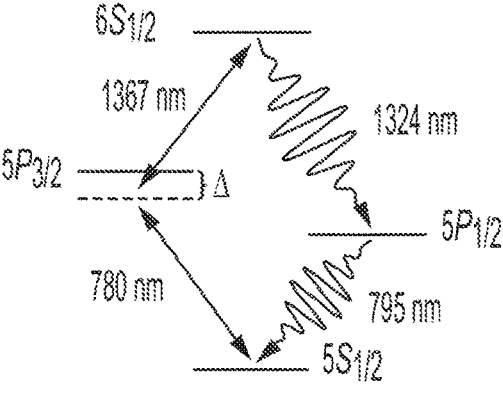
FIG. 3A

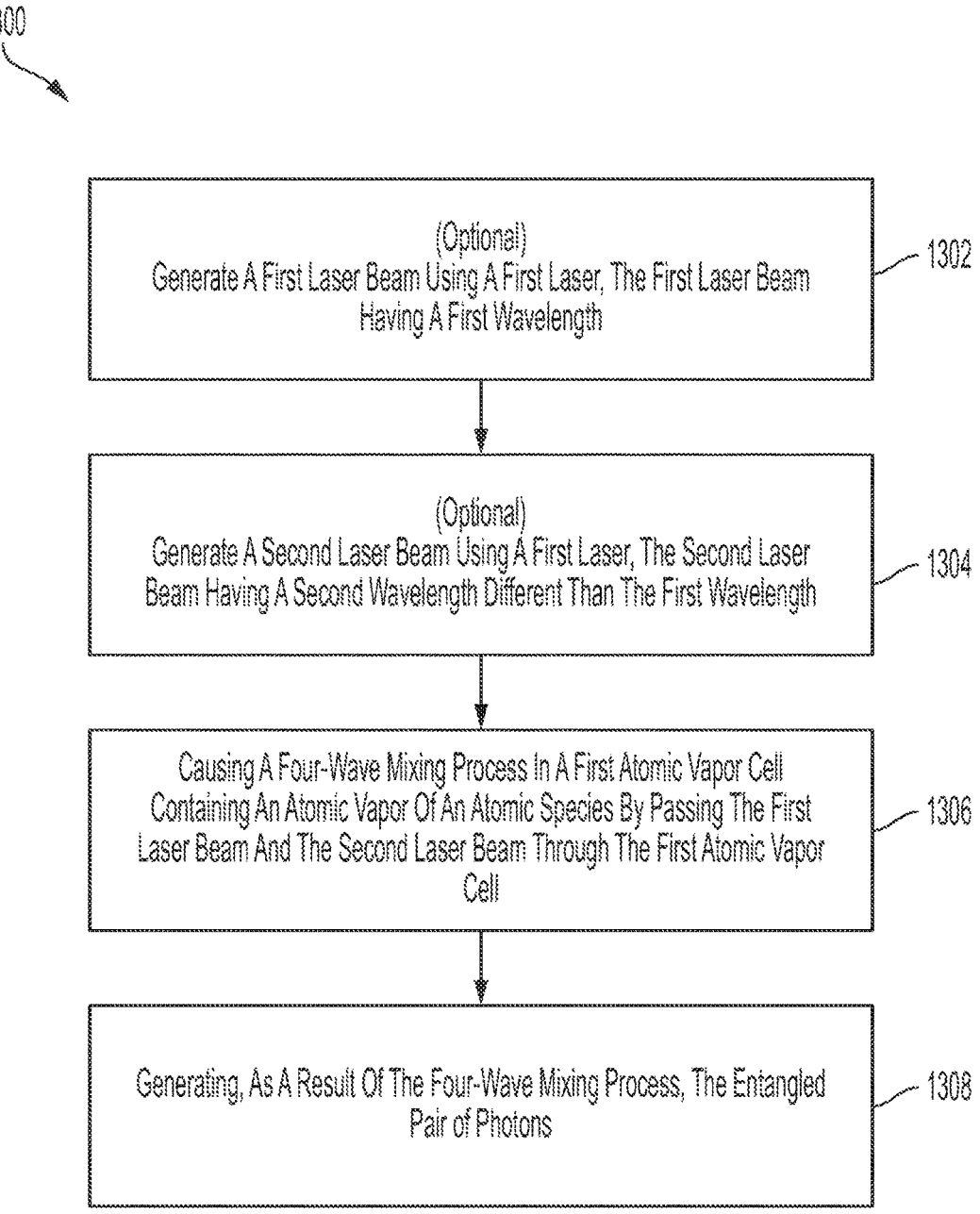

1300

(Optional)
Generate A First Laser Beam Using A First Laser, The First Laser Beam Having A First Wavelength — 1302

(Optional)
Generate A Second Laser Beam Using A First Laser, The Second Laser Beam Having A Second Wavelength Different Than The First Wavelength — 1304

Causing A Four-Wave Mixing Process In A First Atomic Vapor Cell Containing An Atomic Vapor Of An Atomic Species By Passing The First Laser Beam And The Second Laser Beam Through The First Atomic Vapor Cell — 1306

Generating, As A Result Of The Four-Wave Mixing Process, The Entangled Pair of Photons — 1308

FIG. 13

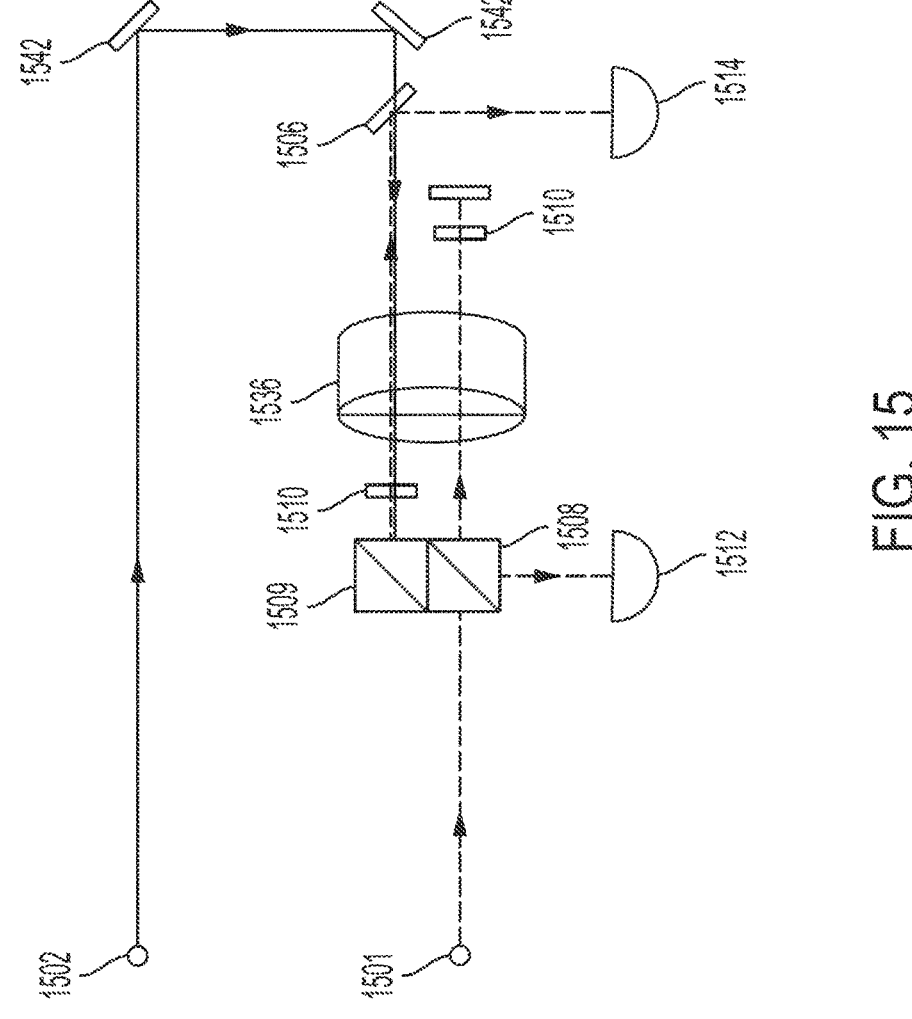
FIG. 15

2000

2100

SYSTEMS AND METHODS FOR PERFORMING QUANTUM TELECOMMUNICATIONS USING A BICHROMATIC ENTANGLEMENT SOURCE

CROSS REFERENCE TO RELATED APPLICATIONS

The present application is a national stage filing under 35 U.S.C. § 371 of International Patent Application Serial No. PCT/US2022/014250, filed Jan. 28, 2022, and titled "SYSTEMS AND METHODS FOR PERFORMING QUANTUM TELECOMMUNICATIONS USING A BICHROMATIC ENTANGLEMENT SOURCE", which claims the benefit under 35 U.S.C. § 119 (e) of U.S. Provisional Patent Application No. 63/143,740, filed Jan. 29, 2021, and titled "SYSTEMS AND METHODS FOR PERFORMING QUANTUM TELECOMMUNICATIONS USING A BICHROMATIC ENTANGLEMENT SOURCE," each of which is hereby incorporated by reference herein in its entirety.

FEDERALLY SPONSORED RESEARCH

This invention was made with government support under DE-SC0021556 awarded by the United States Department of Energy. The government has certain rights in the invention.

BACKGROUND

Quantum networks facilitate the transmission of information in the form of quantum bits ("qubits") between physically separated quantum processors or other quantum devices (e.g., quantum sensors). Quantum networks may be used to enable optical quantum communication over distances and can be implemented over standard telecommunication optical fibers through the transmission of single photons onto which information is encoded (e.g., in polarization). To enable the reliable transmission of quantum information over any distances, additional components may be needed.

SUMMARY

The following is a non-limiting summary of some embodiments of the present application. Some aspects of the present application are directed to a device for generating an entangled pair of photons. The device comprises: a first atomic vapor cell disposed within beam paths of a first laser beam and a second laser beam, the first atomic vapor cell comprising atoms of an atomic species configured to generate the entangled pair of photons in response to excitations caused by photons of the first laser beam and the second laser beam, wherein: the atomic species comprises a first atomic transition and a second atomic transition, the first laser beam has a first wavelength, the first wavelength being tuned to be resonant with the first atomic transition, the second laser beam has a second wavelength, the second wavelength being different than the first wavelength and tuned to be resonant with the second atomic transition, and the first and second wavelengths satisfy conditions for a four-wave mixing process in the first atomic vapor cell.

Some aspects of the present application are directed to a device for generating an entangled pair of photons. The device comprises: a first atomic vapor cell disposed within beam paths of a first laser beam and a second laser beam, the first atomic vapor cell comprising atoms of an atomic species configured to generate the entangled pair of photons in response to excitations caused by photons of the first laser beam and the second laser beam, wherein: the first laser beam has a first wavelength, the second laser beam has a second wavelength, the second wavelength being different than the first wavelength the entangled pair of photons comprises a first photon having a third wavelength and a second photon having a fourth wavelength, the third wavelength is approximately 795 nm, the fourth wavelength is approximately 1324 nm or approximately 1476 nm, and the first wavelength and the second wavelength satisfy conditions for creating electromagnetically-induced transparency (EIT) within the first atomic vapor cell, the EIT creating a transparent medium within the first atomic vapor cell at the third wavelength.

In some embodiments, photons of the entangled pair of photons have a photon linewidth in a range from 10 MHz to 500 MHz. In some embodiments, photons of the entangled pair of photons have a photon linewidth in a range from 10 MHz to 100 GHz.

In some embodiments, the device is configured to generate the entangled pair of photons with a spectral brightness in a range from 20 $s^{-1}$/MHz to 200 $s^{-1}$/MHz.

In some embodiments, the entangled pair of photons comprises a first photon and a second photon, and wherein the device further comprises a Fabry-Perot etalon disposed in a beam path of the first photon and/or the second photon.

In some embodiments, the entangled pair of photons comprises a first photon and a second photon, and wherein the device further comprises a dichroic mirror disposed in a beam path of the first photon and/or the second photon.

In some embodiments, the device further comprises: a first laser configured to generate the first laser beam; and a second laser configured to generate the second laser beam.

In some embodiments, the first laser beam and the second laser beam intersect at a location within the first atomic vapor cell. In some embodiments, the first laser beam is arranged to enter the first atomic vapor cell along a first direction perpendicular to a face of the first atomic vapor cell, and the second laser beam is arranged to enter the first atomic vapor cell along a second direction, the second direction being defined by an angle greater than 0° and less than or equal to 5° between the first direction and the second direction.

In some embodiments, the device further comprises at least one acousto-optic deflector (AOD) positioned between the first and second lasers and the first atomic vapor cell, the at least one AOD configured to deflect the first and second laser beams to create a spatial pattern along at least one axis.

In some embodiments, the entangled pair of photons comprises a first photon having a third wavelength and a second photon having a fourth wavelength.

In some embodiments, the third wavelength is in a range from 750 nm to 850 nm, and the fourth wavelength is in a range from 1300 nm to 1600 nm. In some embodiments, the third wavelength is approximately 795 nm, and the fourth wavelength is approximately 1324 nm or approximately 1476 nm. In some embodiments, the third wavelength is approximately 780 nm, and the fourth wavelength is approximately 1367 nm or approximately 1529 nm.

In some embodiments, the third wavelength and the fourth wavelength are in a range from 750 nm to 850 nm. In some embodiments, the third wavelength is approximately 795 nm, and the fourth wavelength is approximately 762 nm. In some embodiments, the third wavelength is approximately 780 nm, and the fourth wavelength is approximately 776 nm.

In some embodiments, the third wavelength is in a range from 750 nm to 850 nm, and the fourth wavelength is in a range from 450 nm to 550 nm. In some embodiments, the third wavelength is approximately 795 nm, and the fourth wavelength is approximately 475 nm. In some embodiments, the third wavelength is approximately 780 nm, and the fourth wavelength is approximately 480 nm.

In some embodiments, the atomic species comprises rubidium.

In some embodiments, the device further comprises a locking device for locking an output of the first laser to the first wavelength and an output of the second laser to the second wavelength.

In some embodiments, the locking device comprises: a first laser input port coupled to an output of the first laser; a second laser input port coupled to an output of the second laser; a second atomic vapor cell arranged to receive a portion of the first laser beam input to the first laser input port and to receive a portion of the second laser beam input to the second laser input port; a first photodetector arranged to receive the portion of the first laser beam after the portion passes through the second atomic vapor cell; and a second photodetector arranged to receive the portion of the second laser beam after the portion passes through the second atomic vapor cell.

In some embodiments, the locking device further comprises a dichroic mirror configured to: reflect the portion of the first laser beam onto the first photodetector after the portion passes through the second atomic vapor cell and transmit the portion of the second laser beam.

In some embodiments, the locking device further comprises one or more beamsplitter components configured to: split the portion of the first laser beam into a first beam and a second beam, direct the first beam into a first region of the second atomic vapor cell, and direct the second beam into a second region of the second atomic vapor cell.

In some embodiments, the locking device further comprises one or more mirrors configured to direct the second beam onto the second photodetector after the second beam passes through the second region of the second atomic vapor cell.

In some embodiments, the one or more beamsplitter components are further configured to direct the first beam onto the first photodetector after the first beam passes through the first region of the second atomic vapor cell.

In some embodiments, the second atomic vapor cell is arranged to: receive the portion of the first laser beam in a first region of the second atomic vapor cell and in a second region of the second atomic vapor cell; and receive the portion of the second laser beam in the first region of the second atomic vapor cell but not in the second region of the second atomic vapor cell.

In some embodiments, the second atomic vapor cell comprises rubidium atoms.

In some embodiments, the locking device comprises at least one heating element arranged to heat the second atomic vapor cell.

Some aspects of the present application are directed to a method of generating an entangled pair of photons. The method comprises: generating a first laser beam using a first laser, the first laser beam having a first wavelength; generating a second laser beam using a second laser, the second laser beam having a second wavelength different than the first wavelength; causing a four-wave mixing process in a first atomic vapor cell containing an atomic vapor of an atomic species by passing the first laser beam and the second laser beam through the first atomic vapor cell; and generating, as a result of the four-wave mixing process, the entangled pair of photons, wherein: generating the entangled pair of photons comprising generating a first photon having a third wavelength and a second photon having a fourth wavelength, the first wavelength being approximately 795 nm and the second wavelength being approximately 1324 nm or approximately 1449 nm.

In some embodiments, the atomic species comprises a first atomic transition and a second atomic transition, the first wavelength is tuned to be resonant with the first atomic transition, and the second wavelength is tuned to be resonant with the second atomic transition.

In some embodiments, generating the first laser beam comprises generating the first laser beam having the first wavelength, the first wavelength being approximately 780 nm, and generating the second laser beam comprises generating the second laser beam having the second wavelength, the second wavelength being approximately 1367 nm or approximately 1529 nm.

In some embodiments, generating the entangled pair of photons comprises generating an entangled pair of photons have a photon linewidth in a range from 10 MHz to 100 GHz. In some embodiments, generating the entangled pair of photons comprises generating an entangled pair of photons have a photon linewidth in a range from 10 MHz to 500 MHz.

In some embodiments, generating the entangled pair of photons comprises generating entangled pairs of photons with a spectral brightness in a range from 20 s$^{-1}$/MHz to 200 s$^{-1}$/MHz.

In some embodiments, the first atomic transition of the atomic species comprises an excitation of an atom in the first atomic vapor cell from a ground state to a first excited state, and the second atomic transition of the atomic species comprises an excitation of the atom in the first atomic vapor cell from the first excited state to a second excited state.

In some embodiments, the atomic species comprises rubidium.

In some embodiments, passing the first laser beam and the second laser beam through the first atomic vapor cell comprises: passing the first laser beam through the first atomic vapor cell along a first direction perpendicular to a face of the first atomic vapor cell, and passing the second laser beam through the first atomic vapor cell along a second direction, the second direction being defined by an angle greater than 0° and less than or equal to 5° between the first direction and the second direction.

In some embodiments, the method comprises filtering photons of the entangled pair of photons using at least one Fabry-Perot etalon.

In some embodiments, the method further comprises locking the first laser beam to the first wavelength and the second laser beam to the second wavelength by: directing a portion of light from the first laser beam through a second atomic vapor cell and onto a first photodetector and onto a second photodetector; directing a portion of light from the second laser beam through the second atomic vapor cell; locking the first laser beam at the first wavelength based on signals produced by the first photodetector indicating an amount of attenuation of the portion of light from the first laser beam by atoms of the second atomic vapor cell at a characteristic transition frequency; and locking the second laser beam at the second wavelength based on signals produced by the second photodetector indicating an amount of attenuation of the portion of light from the first laser beam by atoms of the second atomic vapor cell at the characteristic transition frequency.

In some embodiments, locking the first laser beam at the first wavelength comprises modulating a voltage input to the first laser and measuring a first error signal generated based on the signals produced by the first photodetector.

In some embodiments, locking the second laser beam at the second wavelength comprises identifying a voltage input to the second laser that causes a greater attenuation of the signals produced by the second photodetector.

In some embodiments, the portion of light from the first laser beam is unpolarized, and wherein the portion of light from the second laser beam is unpolarized.

In some embodiments, the portion of light from the second laser beam is not incident on either the first or second photodetectors.

In some embodiments, the portion of light from the first laser beam is directed through first and second regions of the second atomic vapor cell, and wherein the portion of light from the second laser beam is directed through the first region but not the second region of the second atomic vapor cell.

In some embodiments, the second atomic vapor cell comprises rubidium atoms.

Some aspects of the present application are directed to a device for generating an entangled photon pair. The device comprises: a first laser configured to output a first beam having a first wavelength; a second laser configured to output a second beam having a second wavelength; an interferometer configured to receive the first beam and the second beam; and an atomic vapor cell disposed within a beam path of the interferometer and configured to generate the entangled photon pair.

In some embodiments, the bichromatic entangled photon pair comprises a first photon entangled with a second photon, the first photon having the first wavelength and the second photon having the second wavelength.

In some embodiments, the first wavelength comprises a telecom wavelength in a range from 1260 nm to 1675 nm.

In some embodiments, the first wavelength is approximately 1324 nm and the second wavelength is approximately 795 nm.

In some embodiments, the first wavelength and the second wavelength are tuned to atomic transition levels of an atomic vapor in the atomic vapor cell.

In some embodiments, the interferometer is configured to generate, using the first laser beam and the second laser beam, counter-propagating laser beams of horizontally and vertically polarized light.

In some embodiments, the atomic vapor cell is configured to generate the entangled photon pair using the counter-propagating laser beams generated by the interferometer.

In some embodiments, the atomic vapor cell is configured to generate the entangled photon pair using four-wave mixing.

In some embodiments, the device further comprises a lens between the first and second lasers and the interferometer, the lens configured to focus the first laser beam and the second laser beam at a focal point within the interferometer. In some embodiments, the atomic vapor cell is disposed at the focal point.

In some embodiments, the device further comprises at least one acousto-optical deflector (AOD) positioned between the first and second lasers and the lens, the at least one AOD configured to deflect the first and second laser beams to create a spatial pattern along at least one axis. In some embodiments, the at least one AOD comprises two AODs configured to deflect the first and second laser beams to create a spatial pattern along two axes.

In some embodiments, the interferometer comprises: a first polarizing beam splitter disposed to receive the first and second laser beams incident to orthogonal faces of the first polarizing beam splitter and configured to combine the first and second laser beams to co-propagate along a same optical path; and a second polarizing beam splitter disposed to receive the co-propagating first and second laser beams incident to a same face of the second polarizing beam splitter and configured to output, from two orthogonal faces of the second polarizing beam splitter, separate laser beams comprising horizontally or vertically polarized components of the first and second laser beams, wherein the beam path is a cyclic optical path configured to cause the separate laser beams to return to the second beamsplitter by traversing optical paths of a same length.

In some embodiments, the interferometer comprises a Sagnac interferometer.

In some embodiments, the atomic vapor cell comprises a hermetically-sealed cell and optically transparent walls.

In some embodiments, the atomic vapor cell is coupled to one or more vacuum and/or cooling components, the atomic vapor cell is configured to optically trap an atomic cloud in a confined vapor region, and the atomic vapor cell comprises ports configured to allow multidirectional passage of light through the atomic vapor cell.

In some embodiments, atoms of an atomic cloud disposed within the atomic vapor cell are disposed on a chip comprising a waveguide or are disposed within a hollow optical fiber.

Some aspects of the present application are directed to a method of performing quantum networking. The method comprises: generating a first bichromatic entangled photon pair using a first device at a first location; generating a second bichromatic entangled photon pair using a second device disposed at a second location different than the first location; storing a first photon of each of the first and second bichromatic entangled photon pairs in respective quantum memory devices at the first and second locations, respectively; transmitting a second photon from each of the first and second bichromatic entangled photon pairs to a first two-photon interference measurement device disposed at a third location different than the first and second locations; and entangling states of the stored first photons at the first and second locations to form a newly entangled photon pair by performing a two-photon interference measurement on the transmitted second photons and the first two-photon interference measurement device.

In some embodiments, generating each of the first and second bichromatic entangled photon pairs comprises: causing a four-wave mixing process in an atomic vapor cell containing an atomic vapor by passing a first laser beam and a second laser beam through the atomic vapor cell, the first laser beam having a first wavelength and the second laser beam having a second wavelength, wherein the first wavelength corresponds to a frequency of a first atomic transition of the atomic vapor and the second wavelength corresponds to a frequency of a second atomic transition of the atomic vapor.

In some embodiments, the first photon has the first wavelength, and the second photon has the second wavelength, the first wavelength is a near-infrared wavelength, and the second wavelength is an infrared wavelength.

In some embodiments, the first wavelength is 795 nm and the second wavelength is 1324 nm.

In some embodiments, transmitting the second photon occurs after receiving a timing signal from a GPS-synchronized device.

In some embodiments, the second photon is transmitted to the first two-photon interference measurement device over optical fiber.

In some embodiments, the method further comprises: transmitting, to a second two-photon interference measurement device, one of the stored first photons of the first entangled photon pair; transmitting, to the second two-photon interference measurement device, a stored first photon of a second entangled photon pair; and entangling the other stored first photon of the first entangled photon pair with another stored first photon of the second entangled photon pair by performing a two-photon interference measurement using the second two-photon interference measurement device and the transmitted first photons.

Some aspects of the present application are directed to a method of transmitting quantum information. The method comprises: generating a plurality of bichromatic entangled photon pairs, each of the bichromatic entangled photon pairs being disposed at a different location and comprising a first photon having a first frequency and a second photon having a second frequency; storing the first photon of each bichromatic entangled photon pair at the respective different locations; transmitting the second photon of each bichromatic entangled photon pair to first intermediate locations, each first intermediate location receiving two second photons; performing, at each of the first intermediate locations, a two-photon interference measurement of the received second photons using first two-photon interference measurement devices; and creating a newly entangled state between pairs of stored first photons when a two-photon interference measurement is successfully performed by the first two-photon interference measurement devices.

In some embodiments, the method further comprises: transmitting a portion of the first photons to second intermediate locations, each second intermediate location receiving two first photons; performing, at each of the second intermediate locations, a two-photon interference measurement of the received first photons using second two-photon interference measurement devices; and creating a newly entangled state between different pairs of stored first photons when a two-photon interference measurement is successfully performed by the second two-photon interference measurement devices.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 2A and 2B show illustrative trajectories of generated bichromatic entangled photon pairs, in accordance with some embodiments of the technology described herein.

FIGS. 3A-3D show illustrative energy level diagrams of rubidium with illustrative two-photon decay paths, in accordance with some embodiments of the technology described herein.

FIG. 13 is a flowchart describing a process 1300 for generating an entangled pair of photons, in accordance with some embodiments of the technology described herein.

FIG. 15 is a schematic diagram of an illustrative device 1500 for locking two different lasers at two different frequencies, in accordance with some embodiments of the technology described herein.

DETAILED DESCRIPTION

Figure 1:
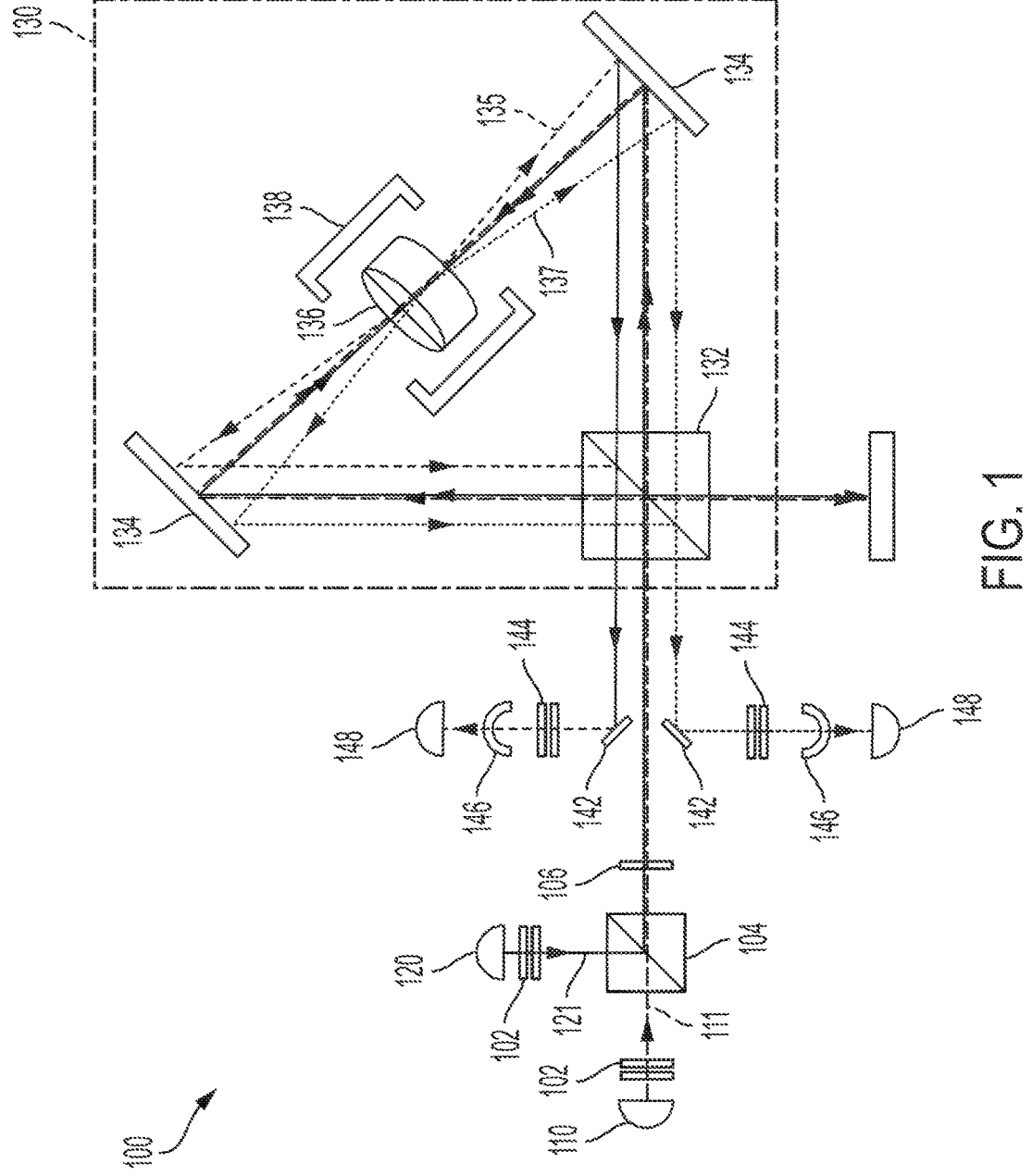
FIG. 1 is a schematic diagram of a bichromatic photon source 100 arranged to generate bichromatic entangled photon pairs and including an interferometer, in accordance with some embodiments of the technology described herein.

Described herein are techniques for generating bichromatic entangled photon pairs and for transmitting quantum information over telecommunications networks using said bichromatic entangled photon pairs. These techniques include the use of laser beams with frequencies tuned to two atomic transitions of an atomic vapor. The laser beams interact with atoms of the atomic vapor and, through a four-wave mixing process, cause bichromatic entangled photon pairs to be emitted from the atomic vapor cell, the photons of the pairs each having a different frequency. The bichromatic entangled photon pairs may then be used to transmit quantum information by generating such pairs at a first node and a second node, storing first photons of the pairs in quantum memories, transmitting second photons of the pairs over optical fibers, and performing a two-photon interference measurement of the received second photons to cause entanglement of the stored first photons, thereby transferring the quantum information from the first node to the second node.

Quantum communication leverages the special properties of quantum mechanics in order to exponentially enhance encoding, processing and transferring information. Whether the end goal is connecting quantum computers, performing ultra-precise sensing measurements, or creating quantum-secured communication networks, all would rely on the connection of heterogeneous quantum devices. Such devices are often not intrinsically, communicatively compatible; for example, they may operate using different frequencies or spatial modes (e.g., transmitting over free space or optical fiber). For example, atomic magnetometers (AMs) use rubidium (Rb) atoms to measure magnetic fields with sensitivities better than $10 \text{ fT}/\sqrt{\text{Hz}}$ by detecting the change in the polarization state of the magnetic fields interacting with the Rb atoms. Networking an array of AMs with a polarization-entangled photon source would be desirable for improving measurement sensitivity, similar to what has been proposed for a long-baseline telescope based on a quantum repeater. Many applications require multiple sensors that work jointly to tackle distributed sensing problems.

However, this realization still remains elusive as AMs and other atomic-based sensors typically operate at wavelengths of approximately 780-795 nm instead of 1300 nm and/or 1550 nm which are commonly used for optical fiber communication. The same challenge is also faced for room temperature quantum memories using Rb atoms and many other atomic technologies such as quantum simulators and photonic phase modulators. The communication between quantum devices is even further complicated as quantum technology transitions from static to mobile quantum devices (e.g., aero- or naval quantum nodes). To connect these mobile nodes to each other efficiently, photons with near-infrared (NIR) wavelengths (780-795 nm) have been shown to experience reduced atmospheric loss and disturbances compared to photons at optical fiber-compatible wavelengths (e.g., infrared wavelengths). There exists a significant and unmet need for devices which enable cross-device frequency compatibility in quantum-secure networks.

Additionally, although frequency converters could be used to address wavelength mismatches between quantum devices and telecommunications infrastructure, frequency converters typically rely on nonlinear crystal sources to generate photons of an appropriate wavelength. These photons generated by a nonlinear crystal can still be incompatible for interfacing with atomic, ionic or other photonic modules because of their large linewidths. For example, photons generated by nonlinear crystals usually have linewidths on the order of 10 THz, which is significantly wider than any linewidth used by atomic or ionic devices such as quantum buffers, simulators, and atomic processors. Quantum computers and sensors typically interact with photons possessing linewidths of few to tens of MHz. To date, such narrow linewidths are not available in any commercial entanglement source.

The inventors have recognized that pairs of atomic transitions in certain atomic species may be used to generate corresponding entangled pairs of photons at telecom and free space communication wavelengths. Accordingly, the inventors have developed a bichromatic photon source using $^{87}$Rb and $^{85}$Rb atoms, the bichromatic source being arranged to generate bichromatic entangled photon pairs. These bichromatic entangled photon pairs include photons that are entangled in the polarization space, but each photon of the bichromatic entangled photon pairs has a different wavelength. For example, one photon of the bichromatic entangled photon pair may have a wavelength in the near-infrared (NIR) while the other photon has an infrared wavelength. The bichromatic photon source utilizes the process of Spontaneous Four-Wave Mixing (SFWM) in a warm atomic vapor cell to convert the photons from two classical pump fields (e.g., from a first and second pump laser) into pairs of single photons at two different wavelengths yet entangled with one another. The bichromatic photon source may use, for example, the atomic transitions of a well-characterized Rb vapor to access a wide range of wavelengths, including telecom O, S, and C bands for fiber transmission and NIR for quantum buffering, processing, and sensing.

In some embodiments, the bichromatic photon source includes an atomic vapor cell disposed within beam paths of a first laser beam and a second laser beam. The first atomic vapor cell includes atoms of an atomic species (e.g., Rb, Cs, or any other suitable alkali metal) in an atomic vapor. The atoms of the atomic species have a first atomic transition and a second atomic transition and are configured to generate an entangled pair of photons in response to optical excitations caused by photons of the first laser beam and the second laser beam.

The inventors have further recognized and appreciated that tuning the wavelengths of the pump lasers to be resonant with atomic transitions of the atomic species can mitigate filtering effects of the atomic vapor cell, thereby enabling narrower photon linewidths. For example, when the pump lasers are operated at wavelengths near, but not at the atomic resonance wavelengths of the atomic vapor, the atoms of the atomic vapor cell may act as a filter, reducing the output and quality of bichromatic entangled photon pairs. In particular, when the pump lasers are operated at wavelengths near, but not at the atomic resonance wavelengths of the atomic vapor (e.g., different by an energy corresponding to approximately 1-2 GHz), the bichromatic photon pairs are emitted with wavelengths close to their respective resonances. However, the atomic vapor is optically thick to the near-resonant photons and, therefore, the generated photons can be absorbed and re-emitted multiple times by atoms within the atomic vapor cell. This effect causes additional noise in the envelope of the generated photons and reduces the number of bichromatic entangled photon pairs that are generated.

The inventors have further recognized and appreciated that operating the pump lasers on resonance with atomic transitions of the atomic species enables customizability of the photon linewidths. In particular, the linewidths of the generated bichromatic entangled photon pairs may be tuned based on the power of the pump laser (e.g., the power of the NIR pump laser). In this manner, the photon linewidths may be customizable in a range from 10 MHz to 100 GHz or in a range from 10 MHz to 500 MHz. Accordingly, in some embodiments, the first laser beam has a first wavelength that is tuned to be resonant with the first atomic transition of the atomic species in the atomic vapor cell, and the second laser beam has a second wavelength different than the first wavelength that is tuned to be resonant with the second atomic transition of the atomic species in the atomic vapor cell.

The inventors have further recognized and appreciated that operating the pump lasers at wavelengths resonant with atomic transitions of the atomic species can satisfy conditions for creating V-type electromagnetically-induced transparency (EIT) within the atomic vapor cell. This EIT creates a transparent medium within the atomic vapor cell at a wavelength of a first photon of the generated bichromatic entangled photon pair. This V-type EIT can be harnessed to increase the spectral brightness of the bichromatic photon source. For example, the inventors have developed techniques to operate the bichromatic photon sources where the first wavelength and the second wavelength of the pump lasers satisfy conditions for creating EIT within the first atomic vapor cell. The EIT creates a transparent medium within the first atomic vapor cell at the wavelength of a photon of the bichromatic entangled photon pair such that the spectral brightness of the bichromatic photon source may be increased to be within a range of 20 to 200 $s^{-1}$ $MHz^{-1}$.

In some embodiments, the entanglement source includes a Rb vapor cell placed in the optical path of an interferometer such that a coherent two-photon pumping (e.g., from two laser beams having two different frequencies) can convert uncorrelated pump photons into polarization-entangled bichromatic photon pairs where the photons of the pairs have two different frequencies. The entanglement source uses the atomic transitions of a well-characterized Rb vapor to access a wide range of wavelengths, including: telecom O and C bands for optical fiber transmission, NIR for quantum storage/buffering, and near-UV for trapped ion qubits and Rydberg excitations. The generated photon pairs may be used, in some embodiments, for transmission of quantum information or alternatively for heralded single photon applications (e.g., quantum key distribution or QKD).

In some embodiments, the atoms of the atomic vapor or cloud may be confined by a magneto-optical trap under vacuum. The trapping apparatus may be placed in the optical path of the interferometer such that a coherent two-photon pumping (e.g., from two laser beams having two different frequencies) can convert uncorrelated pump photons into polarization-entangled bichromatic photon pairs where photons of the photon pairs have two different frequencies. In this configuration, the entangled photons generated by the source have a significantly narrower linewidth due to the mitigation of Doppler broadening resulting from the laser cooling of the atoms in the magneto-optical trap.

In some embodiments, the interferometer may be configured to generate, using the first beam and the second beam, counter-propagating beams of horizontally and vertically polarized light directed to the atomic vapor cell. The atomic vapor cell may be configured to generate the bichromatic entangled photon pair using the counter-propagating beams. In some embodiments, the atomic vapor cell is configured to generate the bichromatic entangled photon pair using four-wave mixing and co-propagating beams.

In some embodiments, the interferometer comprises a first polarizing beam splitter and a second polarizing beam splitter. The first polarizing beam splitter may be disposed to receive the first and second beams incident to orthogonal faces of the first polarizing beam splitter and configured to combine the first and second beams to co-propagate along a same optical path. The second polarizing beam splitter may be disposed to receive the co-propagating first and second beams incident to a same face of the second polarizing beam splitter and configured to output, from two orthogonal faces of the second polarizing beam splitter, separate beams comprising horizontally or vertically polarized components of the first and second beams. The beam path may be a cyclic optical path configured to cause the separate beams to return to the second beam splitter by traversing optical paths of a same length. In some embodiments, the interferometer comprises a Sagnac interferometer, which is particularly robust to effects of mechanical noise (e.g. heat expansion).

In some embodiments, the entanglement source may include a lens between the first and second lasers and the interferometer. The lens may be configured to focus the first beam and the second beam at a focal point within the interferometer. In some embodiments, the atomic vapor cell may be disposed at the focal point.

In some embodiments, the entanglement source may include at least one acoustic optical deflector (AOD) positioned between the first and second lasers and the lens. The at least one AOD may be configured to deflect the first and second beams to create a spatial pattern along at least one axis (e.g., to provide for multiplexing). In some embodiments, the at least one AOD comprises two AODs configured to deflect the first and second beams to create a spatial pattern along two axes. Alternatively, in some embodiments, a spatial light modulator (SLM; not shown) may be used in place of an AOD to deflect the first and second beams to create a spatial pattern along at least one axis.

The inventors have further developed methods for performing quantum networking using a bichromatic entanglement source. In some embodiments, the method includes generating a first bichromatic entangled photon pair using a first device at a first location and generating a second bichromatic entangled photon pair using a second device disposed at a second location different than the first location. The method further includes storing a first photon of each of the first and second bichromatic entangled photon pairs in respective quantum memory devices at the first and second locations, respectively, and transmitting a second photon from each of the first and second bichromatic entangled photon pairs to a first two-photon interference measurement device disposed at a third location different than the first and second locations. Further, the method includes entangling states of the stored first photons at the first and second locations to form a newly entangled photon pair by performing a two-photon interference measurement on the transmitted second photons and the first two-photon interference measurement device.

Following below are more detailed descriptions of various concepts related to, and embodiments of, techniques for implementing dynamic polarization drift correction for quantum telecommunications systems. It should be appreciated that various aspects described herein may be implemented in any of numerous ways. Examples of specific implementations are provided herein for illustrative purposes only. In addition, the various aspects described in the embodiments below may be used alone or in any combinations and are not limited to the combinations explicitly described herein.

I. Bichromatic Entangled Photon Source

FIG. 1 is a schematic diagram of a device 100 for generating bichromatic entangled photon pairs, in accordance with some embodiments of the technology described herein. The device 100 includes first laser 110 and second laser 120 arranged to output laser beams received by an interferometer 130. The first laser 110 and the second laser 120 are further arranged to output laser beams having respective different frequencies. For example, the first laser 110 and the second laser 120 may output laser beams having frequencies tuned to two atomic transitions of an atomic vapor stored within the atomic vapor cell 136 located within the beam path in the interferometer.

In some embodiments, the first laser 110 may be configured to output a first laser beam 111 having a wavelength selected to match a first atomic transition energy of atoms of an atomic species forming the atomic vapor within the atomic vapor cell 136. For example, the frequency may correspond to an infrared frequency (e.g., a wavelength in a range from 1260 nm to 1675 nm). In some embodiments, the first laser 110 may be configured to output a first laser beam 111 having a wavelength of 1324 nm or 1367 nm. In some embodiments, the wavelength may be selected to match the excitation energy of the $5P_{1/2}$ to $6S_{1/2}$ transition of a Rb atom.

In some embodiments, the second laser 120 may be configured to output a second laser beam 121 having a wavelength selected to match a second atomic transition energy within the atomic vapor of the atomic vapor cell 136. For example, the wavelength may correspond to a near-infrared (NIR) frequency (e.g., a wavelength in a range from 750 nm to 1000 nm). In some embodiments, the second laser 120 may be configured to output a second laser beam 121 having a wavelength of 795 nm or 780 nm. In some embodiments, the frequency may be selected to match the excitation energy of the $5S_{1/2}$ to $5P_{1/2}$ transition of a Rb atom.

Figure 4:
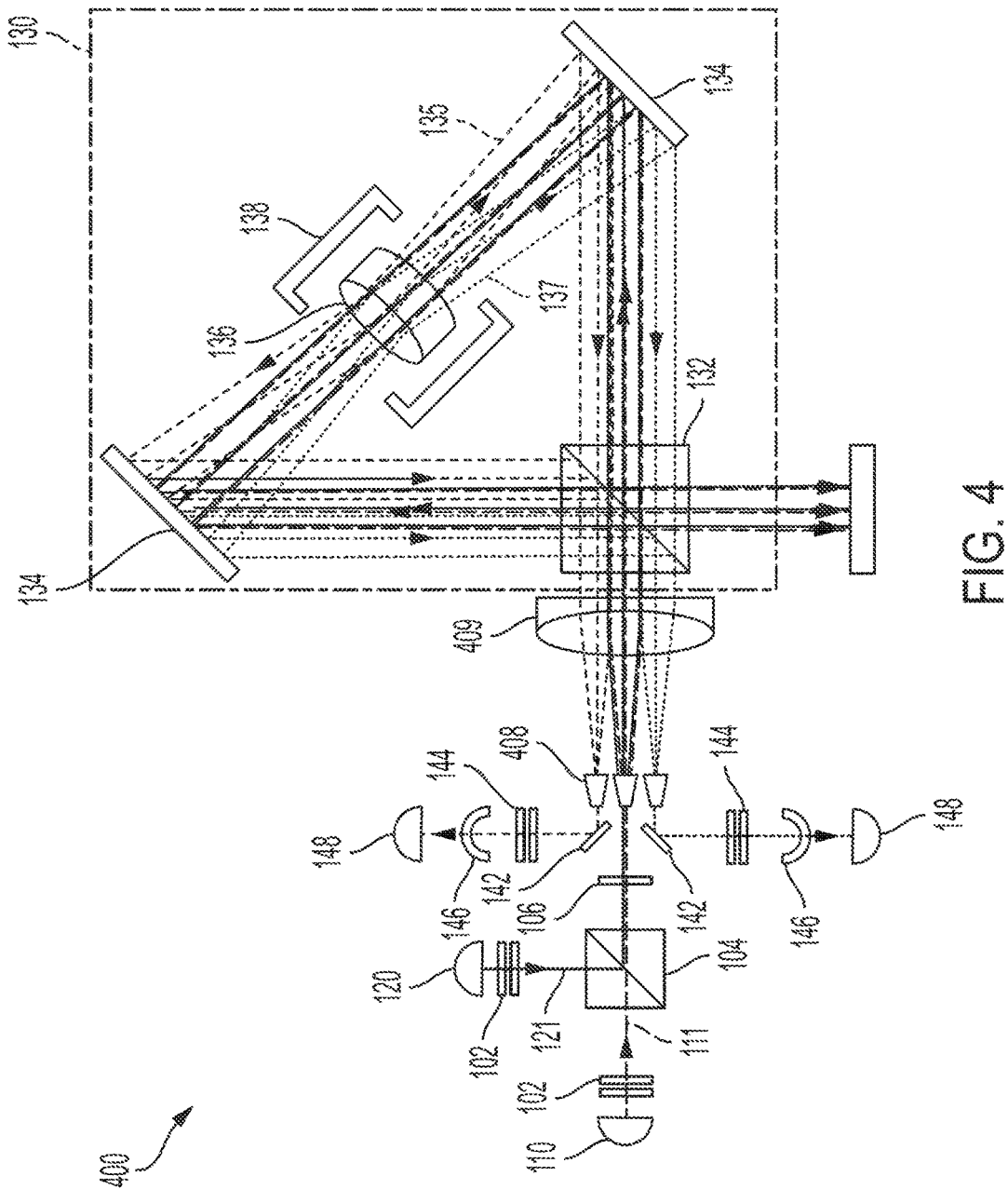
FIG. 4 is a schematic diagram of a bichromatic photon source 400 including an interferometer and configured to generate multiplexed bichromatic entangled photon pairs, in accordance with some embodiments of the technology described herein.

In some embodiments, the laser beams 111, 121 from the first laser 110 and the second laser 120 may pass through one or more optical components before entering interferometer 130. The example of FIG. 1 shows both laser beams 111, 121 passing through wave plates 102, a polarizing beam splitter 104 configured to cause the laser beams to co-propagate along a same optical path, and a half-wave plate 106 before entering the interferometer 130. It should be appreciated that some optical components may be optional and/or not shown in the example of FIG. 1. For example, a lens may be included in the optical path after the half-wave plate 106 and before the interferometer 130 such that the atomic vapor cell 136 is disposed at a focal point of the lens (e.g., as shown in the example of FIG. 4 herein). Alternatively or additionally, some of these optical components in front of the interferometer 130 may be included in the interferometer 130. For example, the polarizing beam splitter 104 and any optical components between the polarizing beam splitter 104 and the polarizing beam splitter 132 of the interferometer may be housed within the interferometer rather than externally, as shown in the example of FIG. 1.

In some embodiments, the interferometer 130 may include a polarizing beam splitter 132, mirrors 134, and a atomic vapor cell 136 surrounded by shielding 138. The polarizing beam splitter 132 may be configured to split the incoming laser beams from the first laser 110 and the second laser 120. The split beams exiting the polarizing beam splitter 132 may be polarized along horizontal and vertical directions (denoted by IH) ) and IV) ), respectively).

In some embodiments, the laser beams exiting the polarizing beam splitter are directed by mirrors 134 towards atomic vapor cell 136. The atomic vapor cell 136 may include a housing supporting a magneto-optical trap configured to confine atoms of the atomic vapor within the atomic vapor cell 136. The housing of the atomic vapor cell 136 may be hermetically sealed to prevent contamination and may include one or more optically transparent windows to allow light to enter and/or exit the atomic vapor cell 136. The atomic vapor cell 136 may be configured to confine a warm atomic vapor or a cold atomic cloud. In some embodiments, atoms of the atomic vapor or cloud may be disposed on a chip comprising a waveguide or may be disposed within a hollow optical fiber. In some embodiments, the atomic vapor cell 136 may be surrounded by shielding 138 to prevent magnetic and/or electric fields from affecting the atomic vapor within atomic vapor cell 136. For example, shielding 138 may be formed of mu-metal to shield the atomic vapor from external magnetic fields.

In some embodiments, atomic vapor cell 136 may contain an atomic vapor comprising atoms that may, upon receipt of counter-propagating pump fields (e.g., laser beams) absorb received photons of certain frequencies, go through a two-stage excitation and decay process, and re-emit photons having entangled polarization states. For example, atomic vapor cell 136 may contain an atomic vapor of Rb (e.g., $^{87}$Rb, $^{85}$Rb, or any other suitable isotope). Alternatively, in some embodiments, atomic vapor cell 136 may contain an atomic vapor of another alkali metal. For example, the alkali metal may include isotopes of Cs (e.g., $^{133}$Cs, or any other suitable isotope).

In some embodiments, the atomic vapor may exhibit a two-photon resonance that permits generation of entangled photon pairs at two desired wavelengths. For example, as shown in FIG. 3A, $^{87}$Rb exhibits a two-photon resonance (or four-wave mixing process) along the transitions $5S_{1/2}$-$5P_{1/2}$-$6S_{1/2}$ which can generate entangled photons having wavelengths of approximately 795 nm and approximately 1324 nm in response to excitation by received light having wavelengths of approximately 780 nm and approximately 1367 nm. This illustrative transition cycle offers few pathways for photons to spontaneously decay to the ground state, providing a higher rate of entanglement and fewer output uncorrelated photons. It should be appreciated that other similar two-photon resonances may exist in other isotopes of Rb or other atomic systems.

Figure 3B:
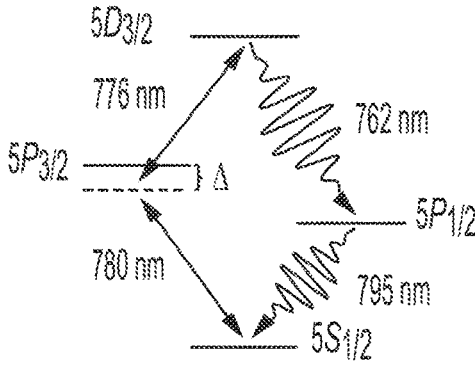
Figure 3C:
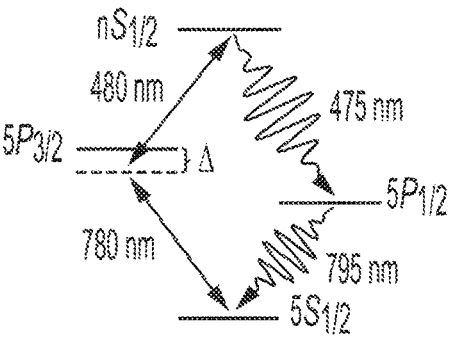
Figure 3D:
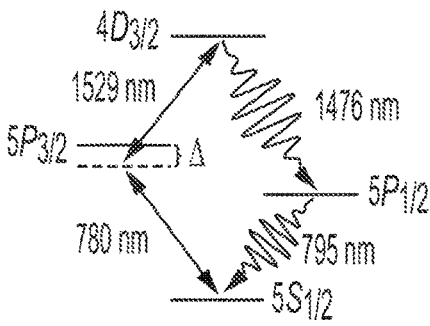

Examples of additional two-photon resonances in Rb are shown in FIGS. 3B-3D, in accordance with some embodiments of the technology described herein. The additional examples of FIGS. 3B-3D show the flexibility of Rb, which may be used to generate a spectrum of wavelengths in the NIR, O, C, and/or S bands. These particular bands have a wide range of applications across quantum communications and computation. For example, the wavelengths 1324 nm, 1476 nm, and 1529 nm each respectively correspond to O, S, and C telecom bands, and are suitable wavelengths for optical fiber communications over large distances. Additionally, the wavelengths 795 nm and 780 nm are commonly used for quantum buffers and sensors, while the wavelengths 776 nm and 762 nm are suitable for free-space communication. Finally, the wavelengths of 480 nm and 475 nm can be used to interface with some Rydberg and ion technologies such as neutral quantum computers and sensors. Examples of laser wavelength pairs and input laser wavelength pairs that may be used with the bichromatic photon sources described herein (e.g., sources 100, 400, and/or 500) are provided in Table 1 herein.

It should be appreciated that the specific examples of laser wavelength pairs and input laser wavelength pairs provided in Table 1 are not the only wavelengths that may be used or generated, as aspects of the technology described herein are not limited in this respect. For example, in some embodiments, the laser wavelength pairs and/or the entangled photon wavelength pairs may be in a range from 750 nm to 850 nm and in a range from 1300 nm to 1600 nm, or in a range from 750 to 850 nm and in a range from 450 nm to 550 nm. Any suitable wavelengths corresponding to the atomic species' desired atomic transition energies may be selected from within these ranges.

TABLE 1

| Laser Wavelength Pairs | Entangled Photon Wavelength Pairs |
| --- | --- |
| 780 nm; 1367 nm | 795 nm; 1324 nm |
| 780 nm; 1529 nm | 795 nm; 1476 nm |
| 795 nm; 1324 nm | 780 nm; 1367 nm |
| 795 nm; 1476 nm | 780 nm; 1529 nm |
| 780 nm; 776 nm | 795 nm; 762 nm |
| 795 nm; 762 nm | 780 nm; 776 nm |
| 780 nm; 480 nm | 795 nm; 475 nm |
| 795 nm; 475 nm | 780 nm; 480 nm |

By tuning the frequencies of the first laser 110 and the second laser 120 to the pump frequencies of the atom in the atomic vapor, the corresponding two-photon resonance may be used to generate a bichromatic entangled photon pair upon decay of the excited atomic state. In some embodiments, the atomic vapor cell 136 may generate and output photons of the bichromatic entangled photon pair in a direction off-axis to the axis of the received laser beams, as shown in the examples of FIGS. 2A and 2B.

Returning to FIG. 1, in some embodiments, the generated photons of the bichromatic entangled photon pairs follow an optical path denoted by the dashed lines. The generated photons may be transmitted from the atomic vapor cell 136 back out of the interferometer using mirrors 134 and polarizing beam splitter 132. The generated photons may then be output at nodes 148 from the entanglement source 100 by optical components including mirrors 142, wave plates 144, and frequency filters 146. The output photons may then be stored or transmitted by entanglement source 100 as needed.

FIG. 4 is a schematic diagram of another bichromatic photon source 400 for generating multiplexed bichromatic entangled photon pairs, in accordance with some embodiments of the technology described herein. Device 400 may be configured to provide spatial multiplexing of the generated bichromatic entangled photon pairs. The spatial multiplexing may allow the input laser beams to address multiple atomic regions within the atomic atomic vapor cell 136 at a same time, increasing the brightness of the entanglement source and the heralding efficiency.

In some embodiments, multiplexing may be provided by one or more acoustic optical deflectors 408 (AODs). AODs 408 may deflect the co-propagating laser beams 111, 121 from the first laser 110 and the second laser 120 along one or more axes. For example, the AODs 408 may deflect the laser beams 111, 121 along a horizontal axis to create a spatial pattern along the horizontal axis. Alternatively or additionally, AODs 408 may deflect the laser beams 111, 121 along the vertical axis to create a two-dimensional spatial pattern in a plane defined by the horizontal and vertical axes.

In some embodiments, a lens 409 may further deflect the laser beams to cause them to co-propagate along parallel optical paths within interferometer 130. The atomic vapor cell 136 may be placed at a focal point of the lens 409, and the co-propagating laser beams may be directed within the interferometer 130 to atomic vapor cell 136 similarly as described in connection with the example of FIG. 1. Upon receipt and absorption of photons of the laser beams, the atomic vapor cell 136 may output bichromatic entangled photon pairs, as indicated by the counter-propagating dashed lines. In some embodiments, the generated bichromatic entangled photon pairs may then exit the interferometer and be directed to AODs 408 for collection and output through output nodes 148 for further storage or transmission.

Figure 5A:
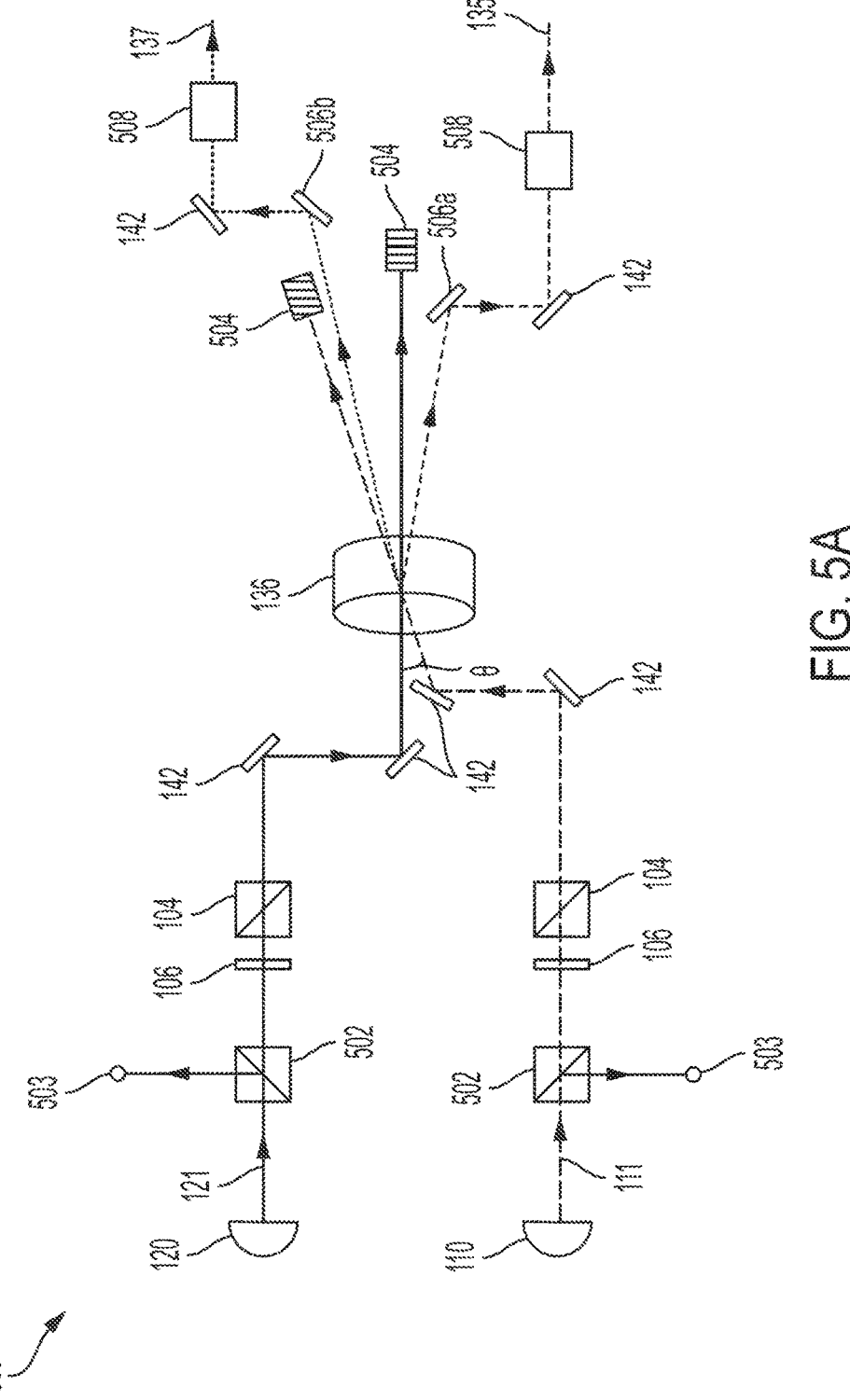
FIG. 5A is a schematic diagram of another bichromatic photon source 500 having no interferometer and arranged to generate bichromatic entangled photon pairs, in accordance with some embodiments of the technology described herein.

FIG. 5A is a schematic diagram of another bichromatic photon source 500 arranged to generate bichromatic entangled photon pairs, in accordance with some embodiments of the technology described herein. The bichromatic photon source 500, in contrast with bichromatic photon sources 100 and 400, does not include an interferometer. Rather, as shown in the example of FIG. 5A, the bichromatic photon source 500 includes a first laser 110 arranged to generate the first laser beam 111 and a second laser 120 arranged to generate the second laser beam 121. It should be appreciated that in some embodiments, the first laser 110 and the second laser 120 may not be included in bichromatic photon source 500, and bichromatic photon source 500 may receive first laser beam 111 and second laser beam 121 through suitable input ports (not depicted).

In some embodiments, the first laser beam 111 and the second laser beam 121 may optionally first pass through beamsplitters 502 (e.g., 50:50 beamsplitters). Beamsplitters 502 may split the first laser beam 111 and the second laser beam 121 such that a portion of the first laser beam 111 and a portion of the second laser beam 121 are directed towards outputs 503. The outputs 503 may be optically coupled to one or more locking devices configured to lock the outputs of first laser 110 and second laser 120 to the desired first and second wavelengths. An example of a locking device configured to lock both outputs of the first laser 110 and the second laser 120 is described in connection with FIGS. 14-17B herein.

In some embodiments, the first laser beam 111 and the second laser beam 121 may then pass through half wave-plates 106 and polarizing beamsplitters 104. One or more mirrors 142 may thereafter direct the first laser beam 111 and the second laser beam 121 into the atomic vapor cell 136. In the example of FIG. 5A, two mirrors 142 are shown for each of the first laser beam 111 and the second laser beam 121, though it should be appreciated that any suitable number of mirrors 142 may be used to direct the first and second laser beams 111, 121, as aspects of the present technology are not limited in this respect.

In some embodiments, the bichromatic photon source 500 may include an acousto-optic deflector (AOD; not pictured) positioned between the first and second lasers 110, 120 and the first atomic vapor cell 136. The at least one AOD may be arranged to deflect the first and second laser beams 111, 121 to create a spatial pattern along at least one axis, thereby enabling multiplexing of the generated entangled photon pairs (e.g., as described in connection with the example of FIG. 4 herein).

In some embodiments, the first laser beam 111 may enter the atomic vapor cell 136 along a first direction and the second laser beam 121 may enter the atomic vapor cell 136 along a second direction different than the first direction. For example, and as depicted in FIG. 5A, the second laser beam 121 may enter the atomic vapor cell 136 along a direction that is perpendicular to a face of the atomic vapor cell 136. The first laser beam 111 may enter the atomic vapor cell 136 along a first direction that is defined by an angle, θ, relative to the second direction such that the first laser beam 111 enters the atomic vapor cell 136 at an angle that is neither parallel nor perpendicular to a face of the atomic vapor cell 136.

In some embodiments, setting the angle θ may be used to reduce unwanted noise in the output of the bichromatic photon source 500. Adjusting the relative angle θ between the first and second laser beams 111, 121 may cause the laser light input to the atomic vapor cell 136 to be spatially separated from the generated photons. For example, the angle θ may be any suitable angle in a range from X to Y degrees. In some embodiments, the angle θ may be approximately 2.7°.

In some embodiments, the bichromatic photon source 500 includes an atomic vapor cell 136 disposed within the beam paths of the first laser beam 111 and the second laser beam 121. The first laser beam 111 and the second laser beam 121 may be arranged to intersect at a location within the atomic vapor cell 136. As described in connection with bichromatic photon sources 100 and 400, the atomic vapor cell 136 may include atoms in the form of an atomic vapor. The atoms may be of an atomic species that has a first atomic transition and a second atomic transition. For example, the atomic species may be rubidium or any other suitable isotope of rubidium or another alkali metal.

In some embodiments, the atoms in the atomic vapor cell 136 may be excited by the first laser beam 111 and the second laser beam 121, causing a four-wave mixing process as described herein. The first laser beam 111 may have a first wavelength, and the second laser beam 121 may have a second wavelength different than the first wavelength. As described in connection with bichromatic photon sources 100 and 400, the first wavelength and the second wavelength may be selected to correspond to energies of atomic transitions of the atomic species disposed in the atomic vapor cell 136. For example, in some embodiments, the first wavelength may be in a range from 750 nm to 850 nm and the second wavelength may be in a range from 1300 nm to 1600 nm or in a range from 450 nm to 550 nm. In some embodiments, the first wavelength and the second wavelength may have values as described in Table 1 herein.

In some embodiments, the four-wave mixing process may cause the generation of a bichromatic entangled photon pair. The photons of the bichromatic entangled photon pair may exit the atomic vapor cell 136 along a first beam path 135 and a second beam path 137, as depicted in the example of FIG. 5A. The portions of the first laser beam 111 and second laser beam 121 that are not absorbed by the atoms of the atomic vapor cell 136 may also exit the atomic vapor cell 136 and be absorbed, for example, by beam traps 504 or other optically absorptive medium.

In some embodiments, the photons of the bichromatic entangled photon pair may include a first photon and a second photon, the first photon having a third wavelength and the second photon having a fourth wavelength different than the third wavelength. The third wavelength and the fourth wavelength may correspond to energies of atomic transitions in a two-photon decay path of the atomic species. For example, the third wavelength may be in a range from 750 nm to 850 nm, and the fourth wavelength may be in a range from 1300 nm to 1600 nm, in a range from 750 nm to 850 nm, or in a range from 450 nm to 550 nm. Additional examples of available wavelengths, for an atomic vapor cell containing rubidium atoms, are provided in Table 1 herein. However, it should be appreciated that the examples provided in Table 1 are non-limiting and non-exhaustive, as other specific wavelengths may be generated by other suitable atomic species (e.g., other alkali metals).

In some embodiments, the photons of the bichromatic entangled photon pair may be incident upon dichroic mirrors 506a and 506b. The dichroic mirrors 506a and 506b may be arranged to reflect light having a wavelength at or around the wavelengths of the generated photons of the bichromatic entangled photon pair. The dichroic mirrors 506a and 506b may also be arranged to transmit light having wavelengths other than the wavelengths at or around the wavelengths of the generated photons such that light at undesired wavelengths may not be transmitted along the remainder of the beam paths 135, 137.

In some embodiments, additional mirrors 142 may further steer the photons of the bichromatic entangled photon pair along the beam paths 135, 137. In some embodiments, the photons of the bichromatic entangled photon pair may thereafter pass through additional filters 508. The filters 508 may include, for example, broadband filters (e.g., interference filters, volume Bragg gratings) or, alternatively, narrowband filters (e.g., Fabry-Perot etalons). Using such narrowband filters can provide an output signal-to-noise ratio on the order of 100. After being filtered, the photons may then be output by the bichromatic photon source 500.

Figure 5B:
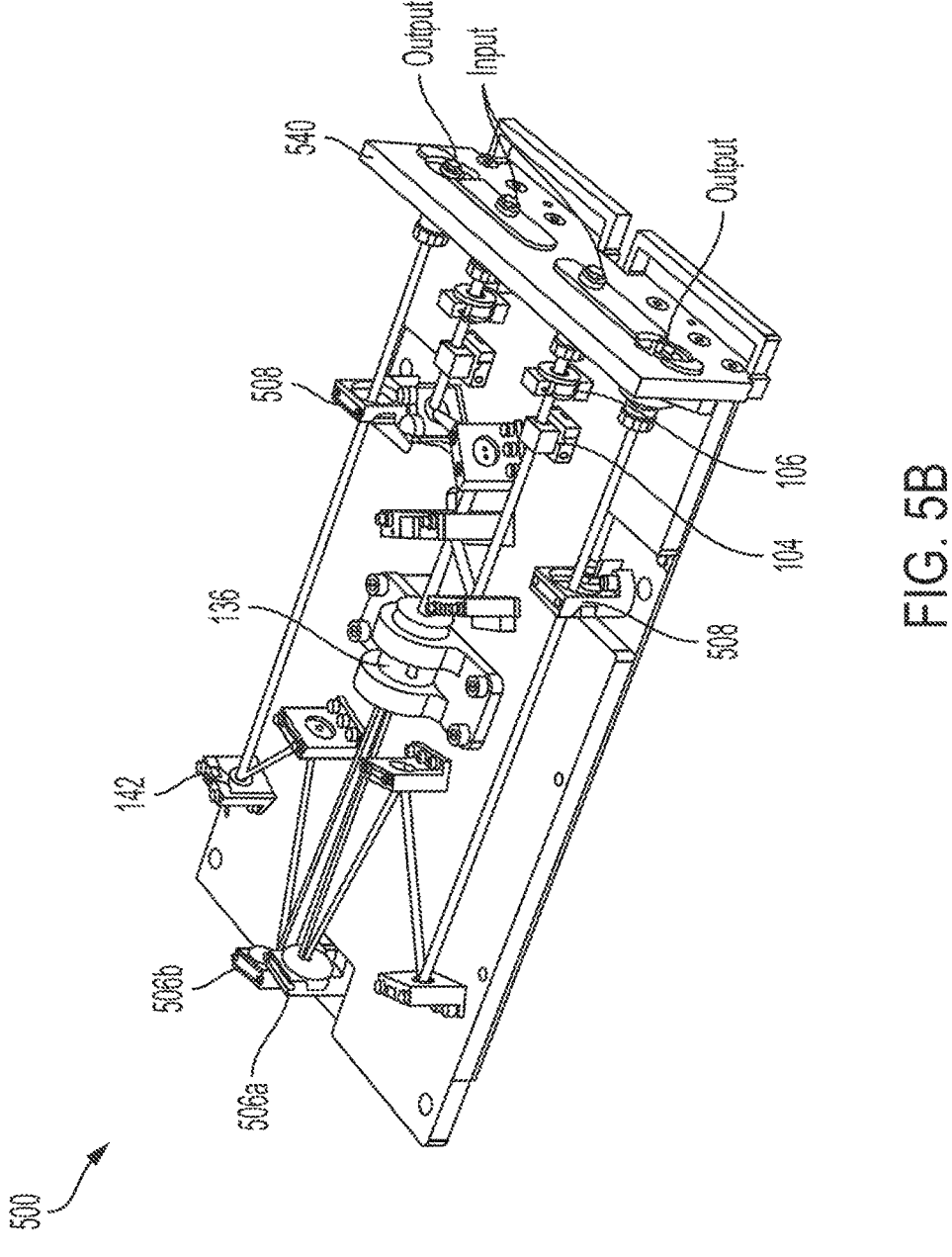
FIG. 5B is an illustrative diagram of the bichromatic photon source 500 arranged in a rack-mounted housing, in accordance with some embodiments of the technology described herein.

The inventors have further recognized and appreciated that miniaturization of any of the bichromatic photon sources 100, 400, and/or 500 would be advantageous for improved mass-production, a reduced form-factor, and compatibility and ease of integration with existing telecommunications infrastructure. As an example, FIG. 5B shows an illustrative diagram of bichromatic photon source 500 arranged in a rack-mounted housing 540, in accordance with some embodiments of the technology described herein. The rack-mounted housing of FIG. 5B may have a footprint size equal to or less than 6 inches×15 inches×2 inches, ensuring the module can be used in a variety of locations and experiments as well as integrated into a deployable rack-mount unit.

In some embodiments, the rack-mounted housing 540 may include inputs that may be optically coupled to first and second lasers 110, 120, as described in connection with FIG. 5A. As before, first laser beam 111 and second laser beam 121 may pass through half waveplates 106 and polarization beam splitters 104 prior to being steered by mirrors 142 into atomic vapor cell 136, wherein the four-wave mixing process causes the generation of a bichromatic entangled pair of photons. The generated bichromatic entangled photon pair of photons are then steered towards the outputs of the rack-mounted housing 540 by dichroic mirrors 506a, 506b and additional mirrors 142 and pass through filters 508 prior to being output by the bichromatic photon source 500. Thereafter, the output bichromatic entangled photon pair may be used to interface with telecommunications, quantum computation, or other quantum information devices as described herein.

The inventors have further recognized that when the pump lasers (e.g., first and second lasers 110, 120) are operated at wavelengths near, but not at the atomic resonance wavelengths of the atomic vapor, the atoms of the atomic vapor cell may act as a filter, reducing the output and quality of bichromatic entangled photon pairs. In particular, when the pump lasers are operated at wavelengths near, but not at the atomic resonance wavelengths of the atomic vapor (e.g., by approximately 1-2 GHz; this off-resonance operation is indicated by A in FIG. 3A), the bichromatic photon pairs are emitted with wavelengths close to their respective resonances. However, the four-wave-mixing cell is optically thick to the near-resonant photons and, therefore, the generated photons can be absorbed and re-emitted multiple times within the atomic vapor cell. This effect causes additional noise in the envelope of near-infrared photons and reduces the number of bichromatic entangled photon pairs that are generated.

Figure 6:
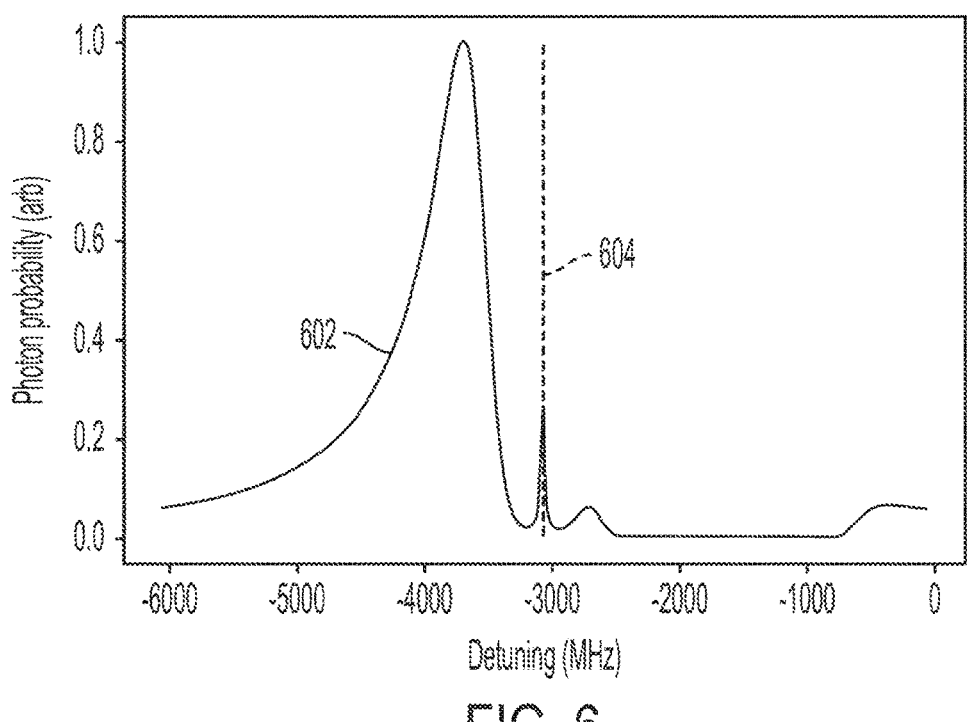
FIG. 6 is an illustrative plot showing the effect of filtering caused by the atomic vapor cell on generated resonant photons.

FIG. 6 illustrates this filtering effect caused by the atomic vapor cell when the pump lasers are operated off-resonance. FIG. 6 shows a curve 602 which illustrates photon probability versus frequency, with the atomic resonance indicated by line 604. The curve 602 includes a long Gaussian tail caused by the Gaussian filtering of the atomic vapor cell off of the Lorentzian pulse of the single photon. Because the Gaussian tail has a large linewidth, it experiences less absorption within the atomic vapor cell relative to the on-resonance Lorentzian pulse, causing the Gaussian tail to dominate the photon's envelope. Accordingly, these filtered photons can have linewidths that are very large (e.g., greater than 100 MHz, up to 10s of GHz) which makes them unable to interface with many quantum devices (e.g., atomic memories or other devices requiring narrow linewidths).

The inventors have recognized and appreciated that tuning the pump lasers (e.g., the first and second lasers 110, 120) to be on resonant with atomic transitions of the atomic species within the atomic vapor cell can mitigate these filtering effects. Additionally, the inventors have recognized and appreciated that operating the pump lasers at such resonant frequencies can satisfy conditions for creating V-type electromagnetically-induced transparency (EIT) within the atomic vapor cell, the EIT creating a transparent medium within the atomic vapor cell at the NIR wavelength (e.g., 795 nm) of a photon of the generated bichromatic entangled photon pair. The V-type EIT can be harnessed to decrease the linewidth of the photon generated at 795 nm, thus increasing the efficiency of coupling the bichromatic photon source to other atomic devices (e.g., quantum memories) with stringent linewidth acceptance criteria. More generally, the brightness as a function of linewidth, or the spectral brightness of the bichromatic photon source, is increased by EIT.

Figure 7:
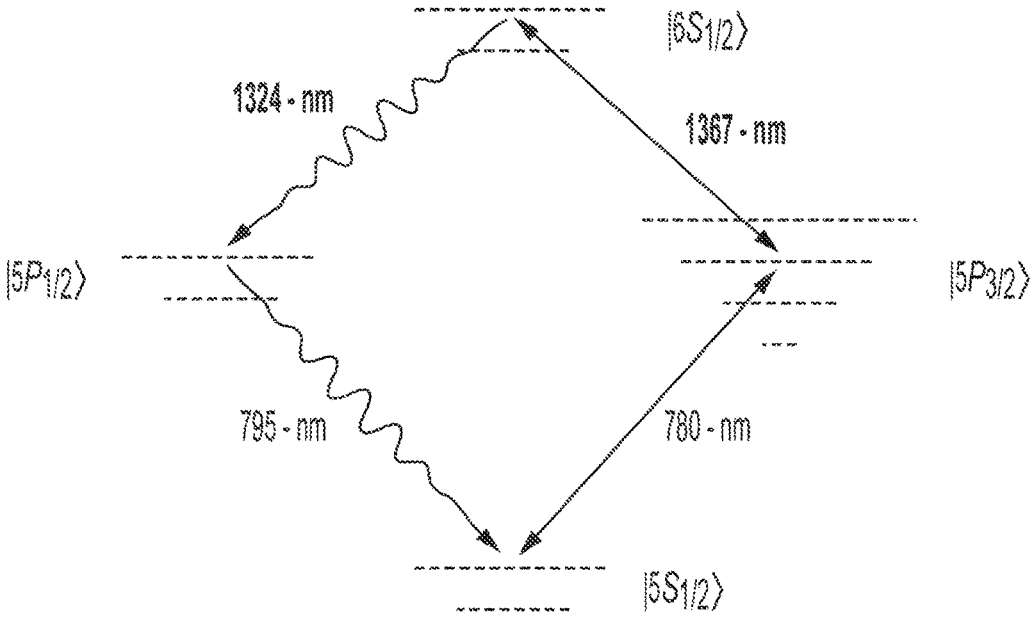
FIG. 7 is another illustrative energy level diagram of an atomic species with a two-photon decay path, in accordance with some embodiments of the technology described herein.

FIG. 7 shows an illustrative energy level diagram with pump wavelengths tuned to be resonant with atomic transitions of rubidium and a corresponding two-photon decay path, in accordance with some embodiments of the technology described herein. The energy level diagram includes the hyperfine splitting in the diagram. In the example of FIG. 7, the pump wavelengths, 780 nm and 1367 nm, correspond to the atomic transitions between the $5S_{1/2}$ and $5P_{3/2}$ states and between the $5P_{3/2}$ and $6S_{1/2}$ states, respectively. The generated photons of the bichromatic entangled photon pair have wavelengths of 1324 nm and 795 nm, corresponding to the atomic transitions between the $6S_{1/2}$ and $5P_{1/2}$ states and the $5P_{1/2}$ and $5S_{1/2}$ states, respectively.

Figure 8:
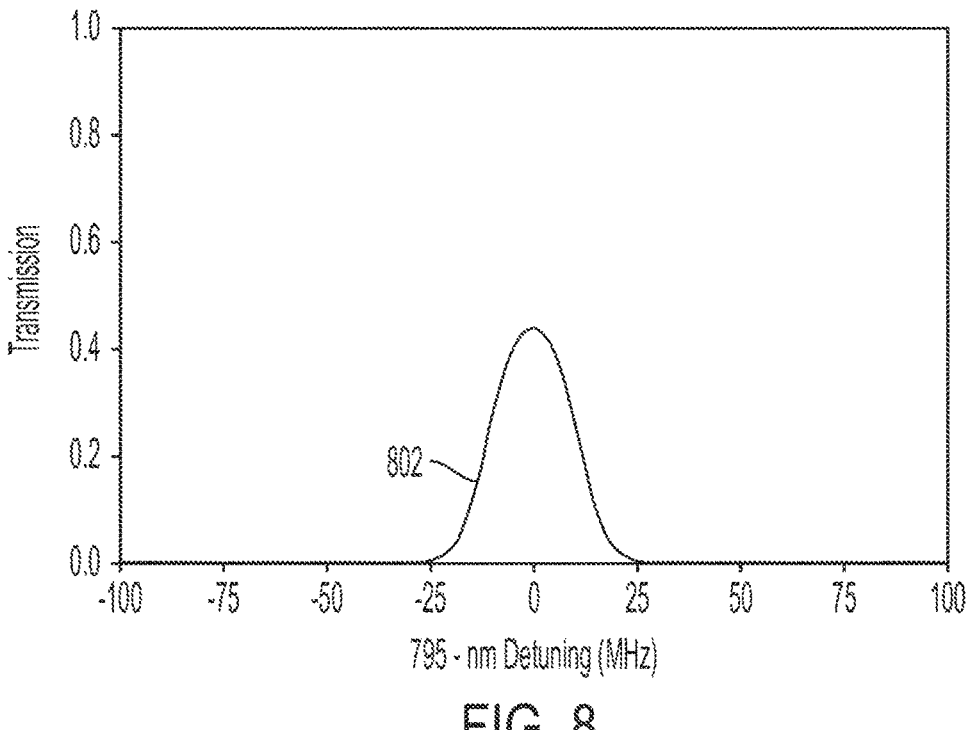
FIG. 8 is an illustrative plot showing the transparency window opened by pumping the atoms of the atomic vapor cell on resonance, in accordance with some embodiments of the technology described herein.

The 1324-nm photons that are generated by the atomic vapor cell can propagate through the atomic vapor cell with near-zero attenuation because of the negligible population in the $5P_{1/2}$ intermediate state. However, at the weak drive limit, most of the atoms in the atomic vapor cell reside in the $5S_{1/2}$ state. At the large optical densities typical of such an atomic vapor cell, this results in large losses for the 795-nm photons as they may be reabsorbed and scattered through the atomic vapor cell. By tuning the power and frequency of the 780-nm pump laser, a V-type EIT effect may be induced between the produced 795-nm photons and the 780-nm pump laser. The V-type EIT effect opens an optical transparency window for the 795-nm photons allowing them to propagate relatively unperturbed out of the atomic vapor cell, resulting in a larger number of bichromatic entangled photon pairs being output by the atomic vapor cell. FIG. 8 shows a curve 802 for an example which is a simulation of the atomic vapor at typical temperatures and optical powers.

FIG. 8 is an illustrative plot showing a simulation of the EIT-induced transparency window opened by pumping the atoms of the atomic vapor cell on resonance, in accordance with some embodiments of the technology described herein. The curve 802 exhibits an increase in the transmission coefficient for photons near the resonant frequency of the output photons (e.g., 795 nm). At this frequency, the output photons should experience a loss of a factor of two instead of a typical loss of 100 dB or greater.

As a result, by tuning the wavelengths generated by the pump lasers (e.g., the first and second lasers 110, 120) to be resonant with the atomic transitions of the atoms in the atomic vapor cell, the number of usable bichromatic entangled photon pairs that are successfully output from the atomic vapor cell is increased significantly. However, a high-rate ("bright") entanglement source alone is not sufficient for interfacing with quantum devices, as large brightness values are most often achieved without considering effects on the photons' linewidth. For example, all currently-available entanglement sources generate photons with linewidths ranging from approximately 1-100 THz, but atomic-based devices, which cover most quantum computing and sensing architectures, typically accept photons with a linewidth no wider than a few tens of MHz. This means that regardless of how high of a rate a source has, only 1 pair out of every approximately 10,000,000 pairs can interface with these quantum devices.

Accordingly, a more reliable metric to focus on is spectral brightness, which is the rate of photons per unit time per unit linewidth ($s^{-1}$ $MHz^{-1}$ herein). A higher value of spectral brightness indicates a higher rate of output of narrower-linewidth photons. The inventors have observed, using a device such as bichromatic photon source 500, a spectral brightness in a range from 20 to 200 $s^{-1}$ $MHz^{-1}$, and theoretically a spectral brightness in a range from 20 to 800,000 $s^{-1}$ $MHz^{-1}$ should be achievable. These values far exceed the spectral brightness measured in most other commercial entanglement sources by orders of magnitude.

Figure 9A:
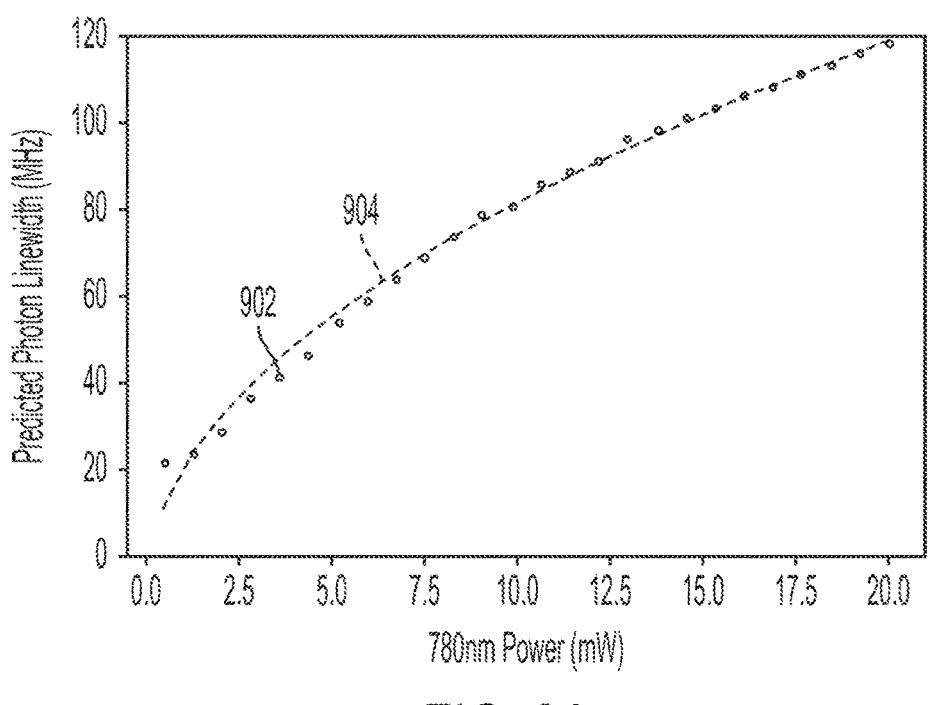
FIG. 9A is an illustrative simulated plot showing the tunable nature of the photon linewidth for a bichromatic photon source in which atoms of the atomic vapor cell are pumped on resonance, in accordance with some embodiments of the technology described herein.

The inventors have further recognized and appreciated that the V-type EIT induced by on-resonance pump lasers enables the tuning of the output photons' linewidth. In particular, the spectral linewidth of the bichromatic entangled photon pair is highly dependent on the laser power used to optically pump the atomic vapor cell. As an example, FIG. 9A is a simulated plot showing a relationship between the predicted photon linewidth and the input pump laser power, with curve 904 being a fit to points 902.

Figure 9B:
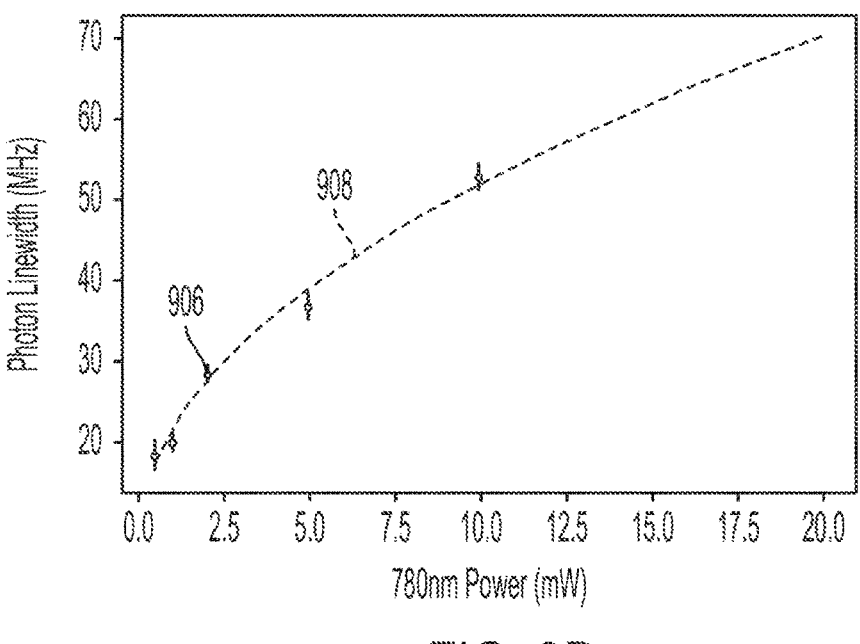
FIG. 9B is an illustrative experimental plot showing the tunable nature of the photon linewidth for a bichromatic photon source in which atoms of the atomic vapor cell are pumped on resonance, in accordance with some embodiments of the technology described herein.

This effect can be explained by the observation that higher power optical pumps have larger Rabi frequencies. These larger Rabi frequencies cause the higher power optical pumps to interact with a larger number of velocity classes in the atomic vapor, which results in a broader spectral width to the emitted photon pairs in view of Doppler effects. The experimental confirmation of this effect is shown in FIG. 9B, which is a plot of measured photon linewidth versus input pump power, with curve 908 being a fit to measured points 906. In this experiment, the 780-nm pump power was varied while the 1367-nm pump power was fixed. The width of the second-order intensity auto-correlation function was then monitored for the output 795-nm photons. This value is directly correlated to the photon linewidth. In both FIGS. 9A and 9B, a $\sqrt{P_{780}}$ scaling is observed for the output photon linewidth, where $P_{780}$ is the power of the 780-nm pump laser, verifying the expected linear scaling between the photon linewidth and the 780-nm pump Rabi frequency.

The inventors have recognized and appreciated that this easily-tunable photon linewidth, enabled by the on-resonant operation of the pump lasers (e.g., first and second lasers 110, 120), allows for the customization of output photon linewidth and spectral brightness in a range from approximately 10 MHz to approximately 100 GHz or in a range from approximately 10 MHz to approximately 500 MHz. Such customizability enables the bichromatic photon sources described herein (e.g., bichromatic photon sources 100, 400, and/or 500) to flexibly and universally couple to multiple quantum technologies with different linewidth and/or spectral brightness requirements. For example, in the ultra-narrow linewidth regime (e.g., under 100 MHz), the photon linewidth may be adjusted by changing the pump laser power. Beyond this regime, linewidths up to approximately 500 MHz are achievable using the bichromatic photon sources 100, 400, and/or 500 by properly detuning the pump lasers (e.g., by operating the pump lasers near, but not at (e.g., approximately 1-2 GHz away from), the wavelength corresponding to the atomic transition energy of the atomic vapor).

Figure 10:
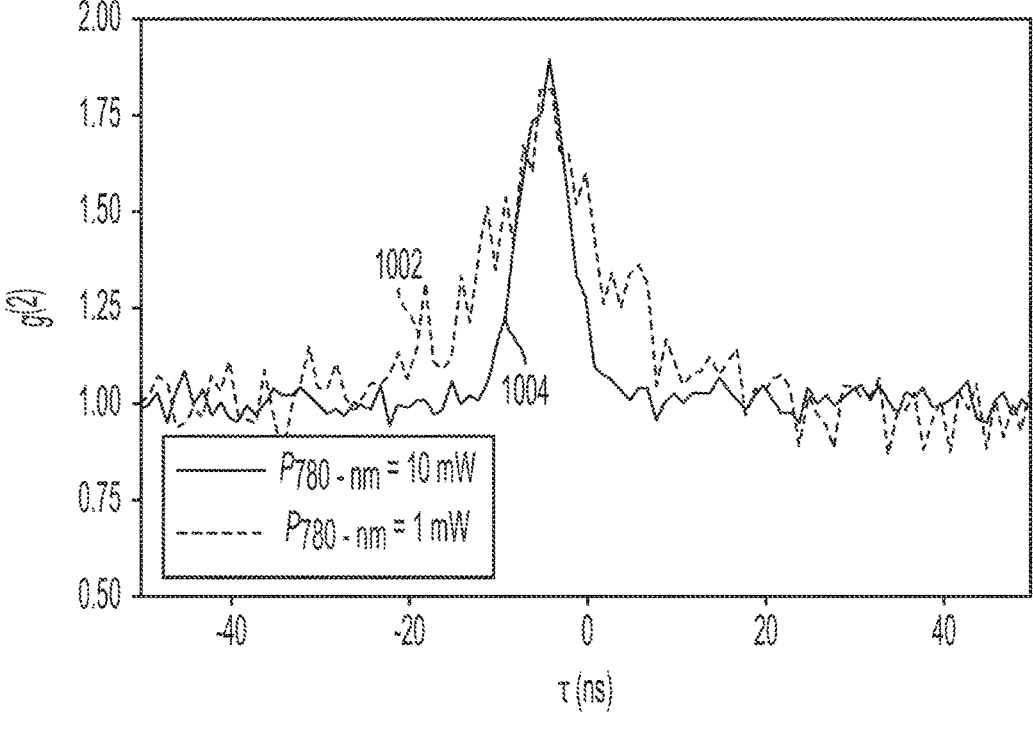
FIG. 10 is an illustrative experimental plot showing the measured coincidence of generated photons for different optical pump powers, in accordance with some embodiments of the technology described herein.

This linewidth tunability has been experimentally verified by measurement of the temporal width of the $g^{(2)}$ functions, or the measured coincidence. An example of this measurement is shown in FIG. 10, in which $g^{(2)}$ values are shown for different temporal bins, $\tau$. Curve 1002 was collected using a 780-nm pump power of 1 mW while curve 1004 was collected using a 780-nm pump power of 10 mW. Curve 1004 is noticeably temporally narrower than curve 1002, showing the effects of adjusting the 780-nm pump power on the generated bichromatic entangled photon pairs.

Figures 11A, 11B:
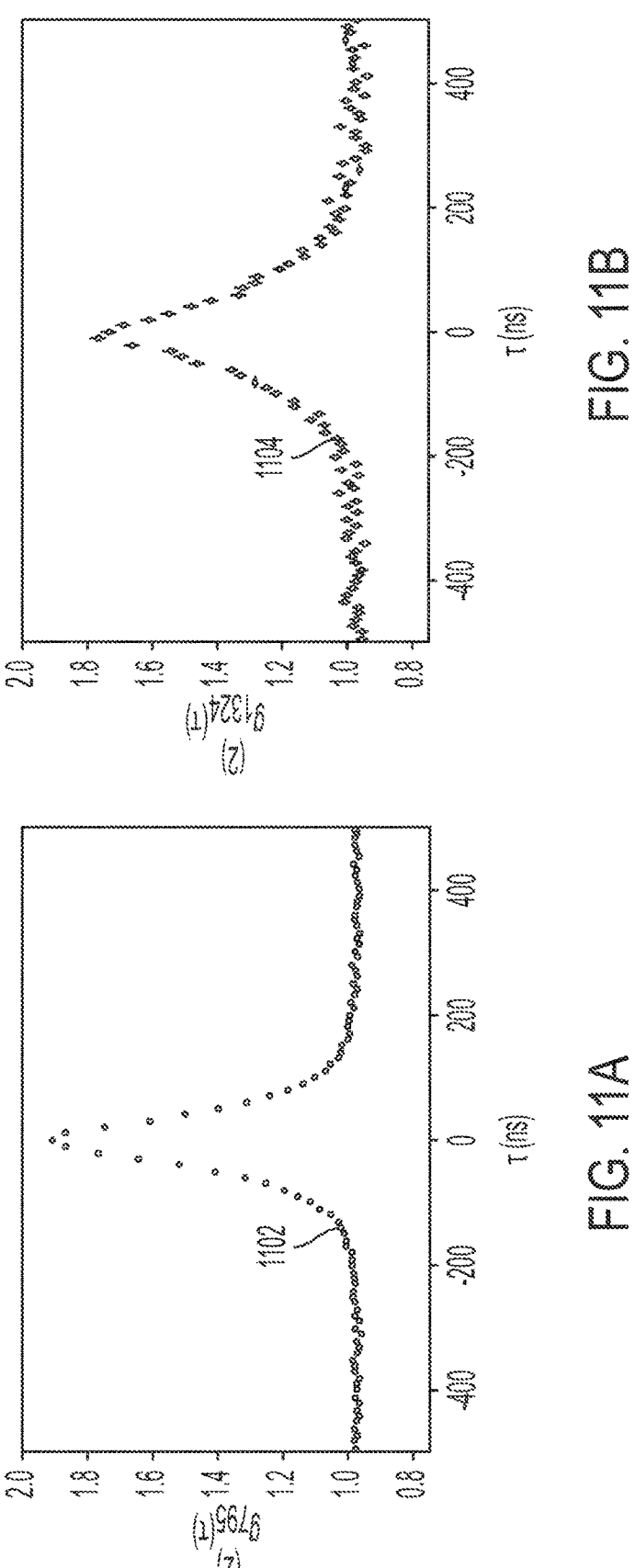
FIGS. 11A and 11B are plots showing measured second-order auto-correlation functions for the two output photon arms of a bichromatic photon source, in accordance with some embodiments of the technology described herein.

The inventors have confirmed the thermal nature of the bichromatic photon sources described herein. FIGS. 11A and 11B show the second-order auto-correlation functions, $g^{(2)}$, measured using Hanbury Brown-Twiss measurements for the two output arms of a bichromatic photon source, in accordance with some embodiments of the technology described herein. The second order intensity auto-correlation functions 1102 and 1104 were measured after each output photon arm passed through an approximately 4 MHz full width at half maximum (FWHM) cavity (e.g., a scanning Fabry-Perot cavity). As can be seen in FIGS. 11A and 11B, for both output photon arms, $g^{(2)}$ shows bunching around $\tau=0$. By taking the temporal linewidth of the detectors into account, both output photon arms are consistent with the expected value of $g^{(2)}(0)=2$ for a pure thermal source.

This temporal correlation violates the classical bound set by the Cauchy-Schwartz inequality. Classically, the second-order auto-correlation functions of the pump lasers can be written as:

$$g_{SI}^{(2)}(0) = \frac{\langle I_S(t)I_I(t)\rangle}{\langle I_S(t)\rangle\langle I_I(t)\rangle}$$

$$g_{S,I}^{(2)}(0) = \frac{\langle I_{S,I}^2(t)\rangle}{\langle I_{S,I}(t)\rangle^2}$$

where the subscripts S and I denote the Stokes and idler laser sources, I(t) denotes the intensity, and $\langle\ \rangle$ denotes a time-averaged quantity. The Cauchy-Schwartz inequality states:

$$\langle AB\rangle^2 \leq \langle A^2\rangle\langle B^2\rangle$$

From this inequality, the following can be derived:

$$[g_{SI}^{(2)}(0)]^2\langle I_S(t)\rangle^2\langle I_I(t)\rangle^2 = \langle I_S(t)I_I(t)\rangle^2 \leq \langle I_S^2(t)\rangle\langle I_I^2(t)\rangle$$

$$[g_{SI}^{(2)}(0)]^2\frac{\langle I_S(t)\rangle^2\langle I_I(t)\rangle^2}{\langle I_S^2(t)\rangle\langle I_I^2(t)\rangle} = \frac{[g_{SI}^{(2)}(0)]^2}{g_S^{(2)}(0)g_I^{(2)}(0)} \leq 1$$

For experimental data acquired from a bichromatic photon source like bichromatic photon source 500, this measured value is:

$$\frac{[g_{SI}^{(2)}(0)]^2}{g_S^{(2)}(0)g_I^{(2)}(0)} = 1100(300) > 1$$

This value is in clear violation of the Cauchy-Schwartz inequality and demonstrates that this source is non-classically temporally correlated.

A photon pair source, however, can produce non-classically temporally correlated photons which are not necessarily entangled. The inventors have accordingly further confirmed the entangled nature of the photons comprising the bichromatic entangled photon pairs generated by the bichromatic photon sources described herein. When the bichromatic photon source is driven with two linearly-polarized pump lasers with identical polarization (e.g., both pump lasers are H-polarized), then the $5S_{1/2}$ to $5P_{3/2}$ and $5P_{3/2}$ to $6S_{1/2}$ two-photon transitions result in zero shift in the magnetic quantum number (e.g., $\Delta m_f=0$). The branching ratio for each of the upper excited states that are populated is exactly a ⅓ split to $\Delta m_f=0$ and $\Delta m_f=\pm1$ transitions. Given that the total two-photon cascade decay must be $\Delta m_f=0$ then, once the two-photon states are projected onto the H and V polarization states, the output entangled pair state has polarization of the form:

$$|\psi\rangle = \frac{1}{\sqrt{2}}(|HH\rangle + |VV\rangle)$$

Figures 12A, 12B:
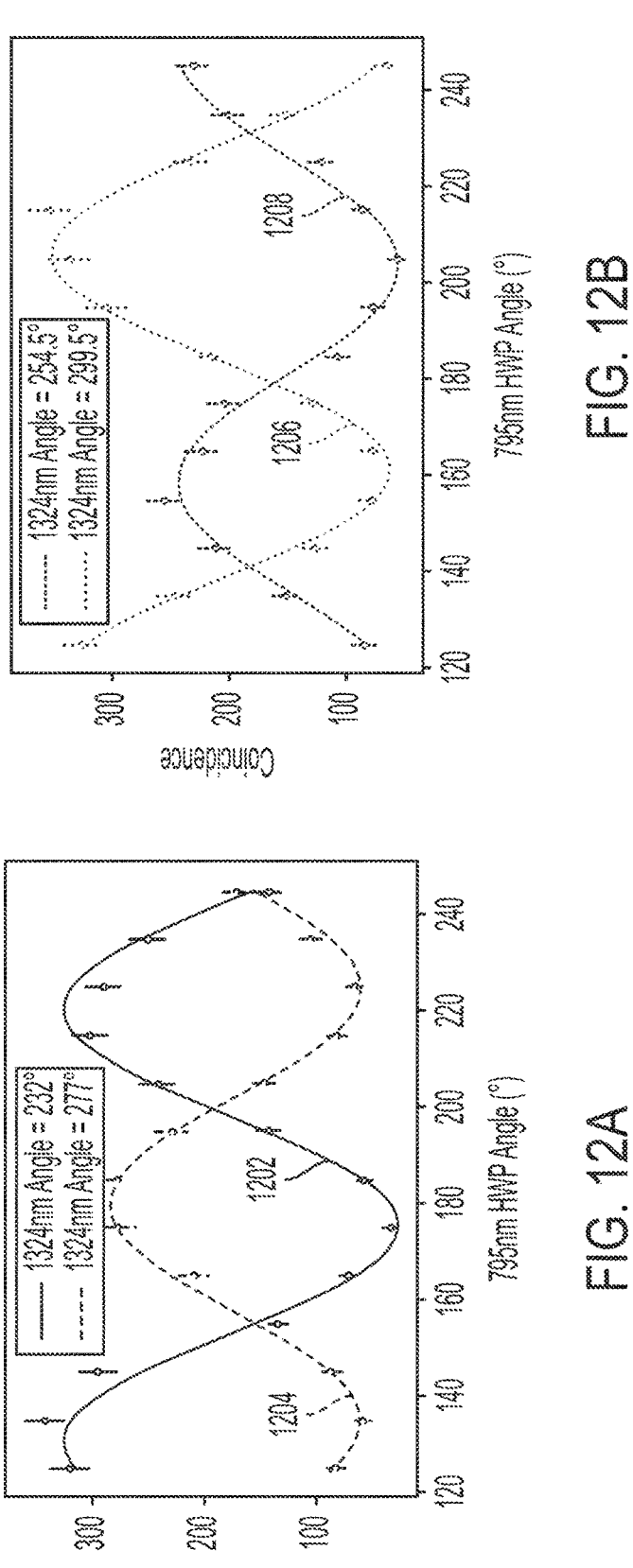
FIGS. 12A and 12B are plots showing measured coincidences for the two output photon arms of a bichromatic photon source versus the rotation angle of a polarizer placed on each arm, confirming a Bell-state of the output photons and in accordance with some embodiments of the technology described herein.

To confirm this polarization, polarizers are placed on each output arm of the bichromatic photon source. The coincidences are then measured as the polarizers are rotated. FIGS. 12A and 12B show these measured coincidences for the 795-nm output photon arm of a bichromatic photon source versus the rotation angle of the polarizer placed on the 795-nm output arm. The curves 1202, 1204, 1206, and 1208 are sinusoidal fits for measurements taken with different polarizer angles on the 1324-nm output photon arm (e.g., 232°, 277°, 254.5°, and 299.5°, respectively). The sinusoidal curves confirm a Bell-state of the output photons.

These measurements can be used to also show a violation of the CHSH inequality, which is a common Bell inequality. Defining a parameter, C(a, b):

$$C(a,\ b) = \frac{N_{++}(a,\ b) + N_{--}(a,\ b) - N_{+-}(a,\ b) - N_{-+}(a,\ b)}{N_{++}(a,\ b) + N_{--}(a,\ b) + N_{+-}(a,\ b) + N_{-+}(a,\ b)}$$

where $N_{++}(a,\ b)$ represents the coincidences between detector $A_+$ and $B_+$ (i.e., the two arms of the biphoton source) for half-waveplate angles a and b, it can be shown that classically:

$$S = |C(a,b) - C(a,b')| + |C(a',b') + C(a',b)| \leq 2$$

From the acquired measurements from the bichromatic photon sources described herein, it has been demonstrated that:

$$S = |C(a,b) - C(a,b')| + |C(a',b') + C(a',b)| = 2.18(6) > 2$$

such that the CHSH inequality is violated, providing clear evidence that the bichromatic photon sources produce pairs of entangled photons.

FIG. 13 is a flowchart describing a process 1300 for generating an entangled pair of photons (e.g., a bichromatic entangled pair of photons), in accordance with some embodiments of the technology described herein. The process may be performed using any one of bichromatic photon sources 100, 400, and/or 500 as described herein, or any suitable alternative arrangement of the same. The process 1300 may optionally begin at act 1302, wherein a first laser beam is generated using a first laser, the first laser beam having a first wavelength. In some embodiments, the first laser may be remotely located from the bichromatic photon source (e.g., in a different room, a different building, and/or a different facility relative to the first atomic vapor source). In some embodiments, the first laser may be co-located with the bichromatic photon source (e.g., in a same room, in a same housing, in a same rack-mounted housing as the first atomic vapor source).

After act 1302, the process 1300 may optionally proceed to act 1304, where a second laser beam is generated using a second laser, the second laser beam having a second wavelength different than the first wavelength. In some embodiments, the second laser may be remotely located from the bichromatic photon source (e.g., in a different room, a different building, and/or a different facility relative to the first atomic vapor source). In some embodiments, the second laser may be co-located with the bichromatic photon source (e.g., in a same room, in a same housing, in a same rack-mounted housing as the first atomic vapor source).

In some embodiments, generating the first and second laser beam may include generating laser beams having first and second wavelengths tuned to any suitable wavelength values as described herein (e.g., as described in Table 1). In some embodiments, generating the first and second laser beam may include generating a first laser beam tuned to a wavelength value in a range from 750 nm to 850 nm and generating a second laser beam tuned to a wavelength value in a range from 450 nm to 550 nm, from 750 nm to 850 nm, and/or from 1300 nm to 1600 nm.

After act 1304, the process 1300 may proceed to act 1306, in which a four-wave mixing process in a first atomic vapor cell is caused by passing the first laser beam and the second laser beam through the first atomic vapor cell. In some embodiments, passing the first laser beam through the first atomic vapor cell is performed by directing the first laser beam along a first direction perpendicular to a face of the first atomic vapor cell. Passing the second laser beam through the first atomic vapor cell may then be performed by directing the second laser beam along a second direction defined by an angle, θ, between the first direction and the second direction. The angle θ may be selected to reduce noise in the generated entangled photon pairs. Accordingly, and as described herein, the angle θ may be greater than 0° and less than or equal to 5°, or, in some embodiments, may be 2.7°. In some embodiments, the first laser beam and second laser beam may be arranged in a counter-propagating arrangement such that the angle θ may be greater than 0° and less than or equal to 180°.

In some embodiments, the first atomic vapor cell contains atoms of an atomic species, the atoms being in the form of an atomic vapor. For example, in some embodiments, the atomic species may be rubidium. Alternatively, in some embodiments, the atomic species may be one or more isotopes of rubidium or one or more isotopes of any other suitable alkali metal (e.g., cesium). The atomic species may have a first atomic transition and a second atomic transition. In some embodiments, the first atomic transition may be from a ground state to a first excited state and the second atomic transition may be from the first excited state to a second excited state.

In some embodiments, the first wavelength and the second wavelength of the first and second laser beams may be tuned to be on resonance with the first atomic transition and the second atomic transition of the atomic species in the first atomic vapor cell. For example, the first wavelength may be tuned to a first wavelength of approximately 780 nm, which is on resonance with the $5S_{1/2}$ to $5P_{3/2}$ atomic transition of rubidium. The second wavelength may then be tuned to a second wavelength of approximately 1324 nm, which is on resonance with the $5P_{3/2}$ to $6S_{1/2}$ atomic transition of rubidium. As described herein, by pumping the atomic vapor on-resonance, a V-type EIT effect may be induced in the first atomic vapor cell, thereby increasing spectral brightness and enabling tunability of the photon linewidth of the generated entangled photon pairs. As a result, the generated entangled photons may have a photon linewidth in a range from approximately 10 MHz to approximately 100 GHz or in a range from approximately 10 MHz to approximately 500 MHz and/or a spectral brightness in a range from 20 s⁻¹/MHz to 200 s⁻¹/MHz.

After act 1306, the process 1300 may proceed to act 1308, in some embodiments. At act 1308, the entangled pair of photons may be generated as a result of the four-wave mixing process. In some embodiments, the entangled pair of photons may include a first photon having a third wavelength and a second photon having a fourth wavelength. For example, the third wavelength may be in a range from 750 nm to 850 nm, and the fourth wavelength may be in a range from 1300 nm to 1600 nm, 750 nm to 850 nm, or 450 nm to 550 nm. In some embodiments, the third wavelength and the fourth wavelength may be any suitable values described herein (e.g., in connection with Table 1 herein). For example, the third wavelength may be approximately 795 nm and the fourth wavelength may be approximately 1324 nm or approximately 1449 nm, in some embodiments.

After the entangled pair of photons are generated, they may be output from the first atomic vapor cell and the bichromatic photon source. In some embodiments, the generated entangled pair of photons may be output from the bichromatic photon source through fiber optic couplers. In some embodiments, after the entangled pair of photons are output from the first atomic vapor cell and prior to being output from the bichromatic photon source, the entangled pair of photons may be filtered. For example, the photons may be filtered using a broadband filter (e.g., interference filters, volume Bragg gratings) or, alternatively, narrowband filters (e.g., Fabry-Perot etalons).

In some embodiments, the process 1300 optionally includes locking the first laser beam to the first wavelength and the second laser beam to the second wavelength. The locking may be performed using a locking device; additional aspects of a locking device are described herein in connection with FIGS. 14-17B.

In some embodiments, locking the first and second laser beams to the first and second wavelengths includes directing a portion of light from the first laser beam through a second atomic vapor cell and onto a first photodetector and onto a second photodetector. The locking also includes directing a portion of light from the second laser beam through the second atomic vapor cell. The portion of light from the first laser beam may be directed through first and second regions of the second atomic vapor cell, while the portion of light from the second laser beam may be directed through the first region but not the second region of the second atomic vapor cell. The portion of light from the second laser beam may not be incident on either the first or second photodetectors. In some embodiments, the portion of light from the first laser beam and the portion of light from the second laser beam are each unpolarized.

In some embodiments, the second atomic vapor cell may include a same atomic species as are contained within the first atomic vapor cell. For example, the first and second atomic vapor cells may both contain rubidium atoms. Alternatively, the first and second atomic vapor cells may both contain other suitable isotopes and/or alkali metal atoms. In some embodiments, the first atomic vapor cell may be an isotopically pure atomic vapor cell and the second atomic vapor cell may comprise a naturally-occurring mix of isotopes.

In some embodiments, the first laser beam may be locked at the first wavelength based on signals (e.g., electrical signals) produced by the first photodetector. The signals produced by the first photodetector may indicate an amount of attenuation of the portion of light from the first laser beam by atoms of the second atomic vapor cell at a characteristic transition frequency of the atomic species within the second atomic vapor cell. For example, locking the first laser beam at the first wavelength may be performed by modulating a voltage input to the first laser and measuring a first error signal generated based on the signals produced by the first photodetector.

In some embodiments, locking the second laser beam at the second wavelength may be performed based on signals (e.g., electrical signals) produced by the second photodetector. The signals produced by the second photodetector may indicate an amount of attenuation of the portion of light from the first laser beam by atoms of the second atomic vapor cell at the characteristic transition frequency. For example, locking the second laser beam at the second wavelength may be performed by identifying a voltage input to the second laser that causes a greater attenuation of the signals produced by the second photodetector.

II. Wavelength Locking of a Laser

For many atomic-based quantum technologies, the atomic-based quantum technology depends on the stimulation of particular atomic transition(s) by a laser. Accordingly, the wavelength of the laser-generated light may need to be tuned to a particular value to effectively stimulate the desired atomic transitions and may need to stably remain at the desired wavelength. For example, when working with rubidium atoms as described in connection with bichromatic photon sources 100, 400, and/or 500 herein, it may be desired to stabilize a first laser to a 780 nm beam. It may be desirable to operate a second laser at a higher wavelength for optical fiber and telecommunications applications. Stabilizing light to telecommunication frequencies is challenging, however, due to the lack of atomic population in the excited states in a room temperature vapor of a material such as rubidium.

The inventors have recognized and appreciated techniques for stabilizing multiple lasers having different wavelengths and the use of these stabilization techniques in conjunction with bichromatic photon sources (e.g., any of bichromatic photon sources 100, 400, and/or 500 herein). In some embodiments, one wavelength may be a wavelength commonly used in telecommunications or quantum computation. Atoms in an atomic vapor cell may be excited to two different excited states and these states detected via saturation spectroscopy. In particular, the light from a first laser may be split into multiple beams and these beams directed through two different regions of the atomic vapor cell and onto two different photodetectors. This light may excite atoms within each region of the cell to a first excited state. Further light from the first laser may be passed through the excited atoms to detect the extent to which the light is attenuated, and thereby detect whether the first laser is properly tuned to a first frequency corresponding to the excitation. If the light is not maximally attenuated, given the density of the atoms, this implies that the first laser is not tuned to the correct frequency and is thereby not producing the desired excitation. Moreover, light from the second laser may be directed onto only one of the two regions of the cell to cause further excitations from the first excited state to a second, higher, excited state. Further light from the first laser may be passed through these excited atoms to detect the extent to which the light is attenuated, and thereby detect whether the light from the second laser is properly tuned to a second frequency corresponding to the higher excitation. As a result, the two photodetectors measuring signals from the aforementioned absorption of light from the first laser may produce signals that can be used to lock the frequency of both lasers.

Figure 14:
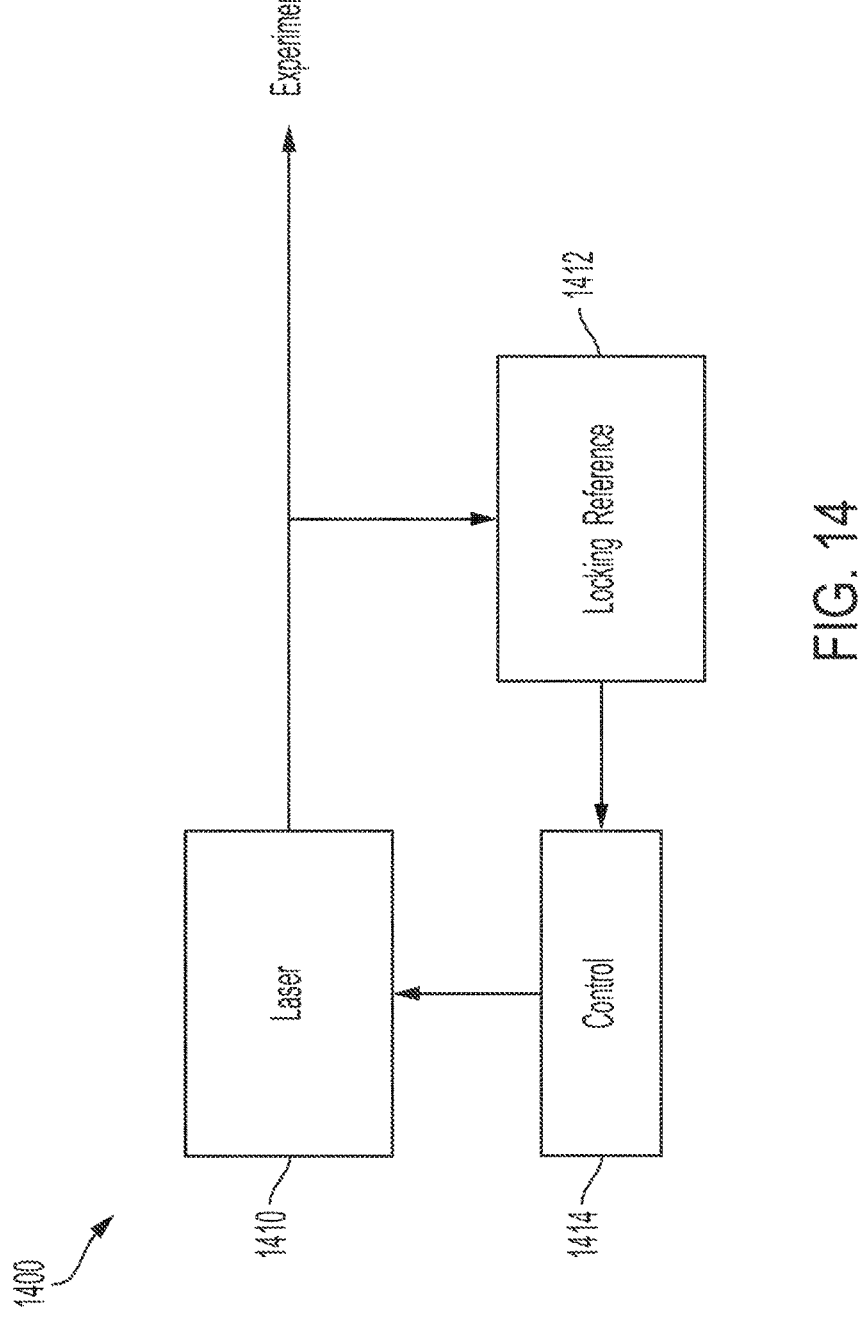
FIG. 14 is a schematic diagram of a system 1400 for stabilizing the wavelength of a laser, in accordance with some embodiments of the technology described herein.

The general process of stabilizing a laser's output wavelength is illustrated in FIG. 14, according to some embodiments. System 1400 includes a laser 1410, which is to be used for an experiment (e.g., to be directed onto a quantum system, such as an atomic based quantum system). Light from the laser 1410 is also directed onto a locking reference device 1412, which is a device that can produce one or more signals indicating the extent to which the frequency of the laser 1410 is being driven at a desired frequency. The locking reference may utilize various technologies to produce an error signal that is indicative of the current laser frequency, which is provided to a control unit 1414 that drives the laser. For instance, the error signal may be an electronic signal that is proportional to the laser's deviation from the desired frequency.

In some embodiments, the control unit may repeatedly modulate the frequency and/or amplitude of the laser over a small range of frequencies (e.g., over hundreds of MHz for a laser operating at several hundred THz) to produce error signals that indicate a deviation from the desired frequency relative to the current laser frequency. Typically, the error signal is arranged so that it is possible to tell from its value whether the laser frequency is higher or lower than the desired frequency, thereby providing feedback to the control unit that indicates how the control unit should adjust the laser control to increase or decrease the frequency of the laser (e.g., increase or decrease a voltage input to the laser). By using a suitable locking reference device, therefore, the above-described feedback loop can stably maintain the laser at a desired frequency, which may also be referred to as a "locking" the laser.

FIG. 15 is a schematic diagram of an illustrative device 1500 for locking two different lasers at two different wavelengths, in accordance with some embodiments of the technology described herein. In the example of FIG. 15, system 1500 includes a first laser 1501 (which may have a nominal wavelength in the near infrared range, e.g. at or around 780 nm) and a second laser 1502 (which may have a nominal wavelength in the range typically used for telecommunication, e.g., at or around 1367 nm). System 1500 is arranged to stabilize ("lock") the output wavelengths of two lasers (e.g., first laser 110 and second laser 120) using the following process.

Figure 16A:
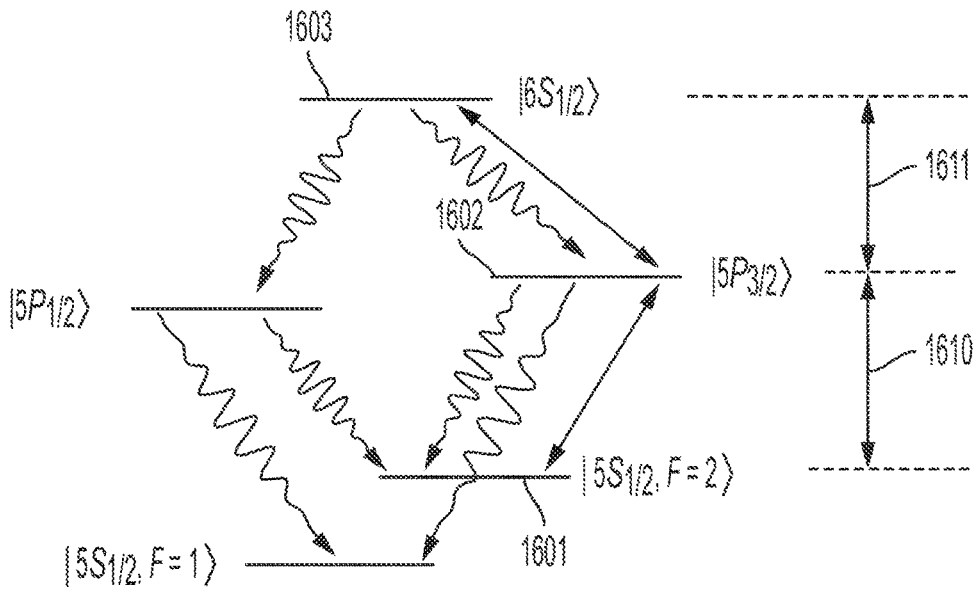
FIG. 16A shows atomic excitations of rubidium, in accordance with some embodiments of the technology described herein.

To first describe the paths that light from lasers 110 and 120 follows in system 1500, light from the laser 110 enters the system 1500 at input 1501 and is incident upon the 50:50 beamsplitter 1508. Some of the light from laser 110 is split and then passes through the 50:50 beamsplitter 1509, an attenuator 1510, and through the upper portion of atomic vapor cell 1536. If the laser 110 is properly tuned to a wavelength corresponding to an atomic transition of atoms in the vapor cell 1536, this light may excite atoms in the beam path to a higher energy level. An illustrative example of such energy levels is shown in FIG. 16A for rubidium, with a first excitation 1610 shown between a ground state energy level 1601 and a first excited state 1602. In the case of rubidium, this excitation energy 1610 corresponds to a wavelength of approximately 780 nm. Therefore, a laser tuned to this wavelength and directed onto rubidium atoms in their ground state will excite some of those atoms to the excited state 1602.

The light from the laser 110 that passed through the vapor cell 1536 then passes through a shortpass mirror 1506 (e.g., a dichroic mirror configured to transmit comparatively lower wavelengths and reflect comparatively higher wavelengths) onto a photodiode 1514. The manner in which the signal from photodiode 1514 may be utilized to lock the laser 120 will be described below.

Other light from the laser 110 that was not reflected by the 50:50 beamsplitter 1508 into 50:50 beamsplitter 1509 is reflected by 50:50 beamsplitter 1508 into the lower portion of the atomic vapor cell 1536. The atoms in the vapor cell may be excited by this light, which is then reflected by ND filter component 1510 (which also attenuates the light). The light then travels back through the vapor cell 1536 and through the 50:50 beamsplitter 1508 onto photodiode 1512. The reflected light is attenuated and counter-propagating relative to the initial light entering the left hand portion of the vapor cell 1536, and may be attenuated based on the extent to which the initial light excited the atoms in the vapor cell. This light is then incident on the photodiode 1512. The signal from photodiode 1512 may be utilized to lock the first laser 110, as will be described below.

Light from the second laser 120 is also reflected into the upper portion of the vapor cell 1536 via mirrors 1524 and shortpass mirror 1506. If the second laser 120 is properly tuned to a frequency corresponding to an atomic transition of atoms in the vapor cell 1536, this light may excite those atoms to a higher energy level. In particular, the second laser 120 may desirably be tuned so that atoms excited to a first energy level by the laser 110 as described above may be further excited to a higher energy level by the light from laser 120. Returning to the diagram of FIG. 16A, for rubidium, for example, atoms excited to the first excited state 1602 may be further excited to state 1603 via a second excitation 1611. In the case of rubidium, this excitation energy 1611 corresponds to approximately 1367 nm, so a laser tuned to this wavelength and directed onto rubidium atoms in their first excited state 1602 will excite some of those atoms to the excited state 1603.

It may be appreciated that components may be utilized in system 1500 other than those shown. For example, instead of the shortpass mirror 1506, a beamsplitter could be employed to combine the two incident beams.

Figure 16B:
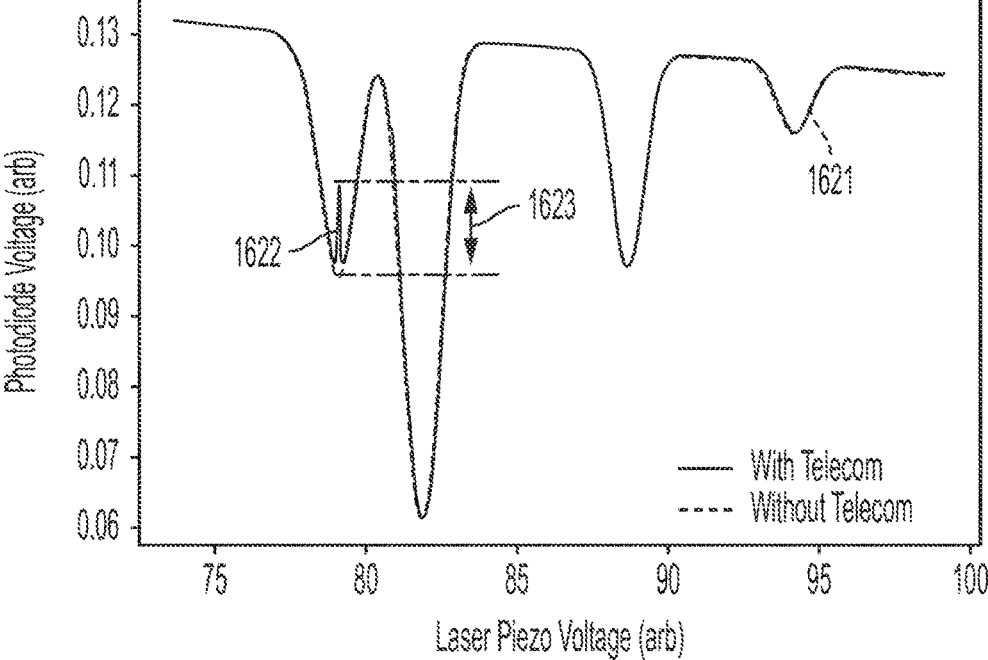
FIG. 16B shows attenuation of a signal received by a photodetector, in accordance with some embodiments of the technology described herein.

As a result of the above arrangement, the following effects may be observed. First, the light that is incident on photodiode 1512 will show greater attenuation when the light from laser 110 has been tuned to the wavelength corresponding to the excitation 1610. This effect is depicted in FIG. 16B, which illustrates the voltage input to a laser (and which may be considered to be equivalent to the laser's frequency) versus a voltage measured by a photodiode (and which may be considered to be equivalent to a measured amplitude of the laser). Focusing on line 1621 ("without telecom"), it may be seen that at certain input voltages (wavelengths), the photodiode signal produced by photodiode 1512 is attenuated. This effect is caused by the laser wavelength being aligned with the energy of an atomic transition. In this situation, the laser excites atoms to a higher energy state and the amount of light that is transmitted through the vapor cell is reduced. Based on this effect, the laser 110 may be locked to the wavelength of the atomic transition via the method discussed in relation to FIG. 14 or otherwise. For example, the laser input voltage may be swept over a small range of values and the photodiodes may produce values indicating amounts of attenuation for these input voltages. A suitable error signal can be generated so that the laser can be driven to the proper voltage that corresponds to the greatest attenuation of the photodiode signal within a particular voltage range of interest (e.g., around a particular one of the different attenuations shown in FIG. 16B).

An additional effect produced by the system 1500 is that the light that is incident on photodiode 1514 will show less attenuation when the light from laser 120 has been tuned to the wavelength corresponding to the excitation 1611. As described above, the light that is incident onto photodiode 1514 passes through the upper portion of the vapor cell 1536, and light from both lasers 110 and 120 is directed into that portion. As a result, if laser 110 is locked at the wavelength corresponding to excitation 1610, some of the atoms in the upper portion of the vapor cell will be excited to first excited state 1602. Moreover, if laser 120 is locked at the wavelength corresponding to excitation 1611, some of the atoms in the first excited state will be further excited to second excited state 1603. Since the light from laser 110 that passes through the atomic vapor cell 1536 will be attenuated based on the extent to which atoms in the atomic vapor cell are in the first excited state, further exciting some of these atoms to the second excited state will reduce the amount of attenuation experienced by the light from the laser 110. This effect is also depicted in FIG. 16B, which shows in curve 1622 ("with telecom") the photodiode 1514 signal in the highlighted attenuated region, illustrating that the amount of attenuation has decreased (i.e., the photodiode voltage is higher by an amount 1623) than was the case for the photodiode 1512 signal, due to the effect on the atoms in the vapor call caused by the laser 120.

As a result of these effects, both lasers 110 and 120 may be locked to desired wavelengths corresponding to the atomic transitions 1610 and 1611. The laser 110 may be locked to the wavelength corresponding to the atomic transition 1610 by searching for the position of the attenuated region of the spectrum shown in FIG. 16B as discussed above using output from the photodiode 1512. The laser 120 may be locked to the wavelength corresponding to the atomic transition 1611 by identifying the presence of reduced attenuation of the signal 1623 within the attenuated region of the spectrum using output from the photodiode 1514.

One advantage of this process discussed above may be that the techniques are not limited by any polarization states of the light from either laser 110 or laser 120. As such, if polarization states of the light are to be used in an experiment (e.g., to encode quantum information), the locking system described above may be implemented successfully, since the system 1500 does not depend upon, and is not affected by, polarization states of the light. As such, in some embodiments each of the laser 110 and/or laser 120 may input unpolarized light to system 1500. In some embodiments, system 1500 may not comprise any optical elements that depend upon the polarization state of the light incident upon said optical elements.

Moreover, it will be appreciated that the illustrative example of rubidium is merely provided as one example and that other pumping schemes could be envisioned with any other atomic ladder system, including the alternative 795 nm and 1324 nm transitions in rubidium, any other alternative transitions in rubidium described herein, any suitable alkali atoms, or any other suitable atom. Accordingly, the techniques described herein can be used for an atomic ladder scheme regardless of the atoms or the wavelengths in question.

According to some embodiments, two separate atomic vapor cells could be employed instead of the single vapor cell 1536 shown in FIG. 15. For example, instead of directing light into two separate regions of the atomic vapor cell as described, two distinct vapor cells could be used, with light being directed into each cell separately. According to some embodiments, the vapor cell 1536 may be heated (e.g., to around 40° C.), or may be held at room temperature.

Figure 17B:
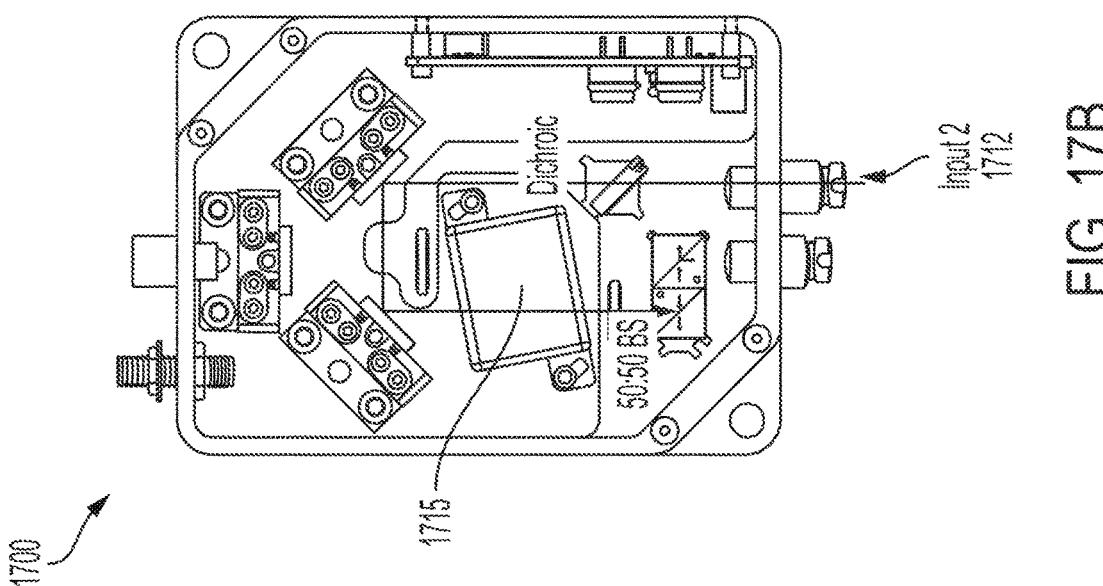
FIGS. 17A-17B show an illustrative locking device 1700, in accordance with some embodiments of the technology described herein.
Figure 17A:
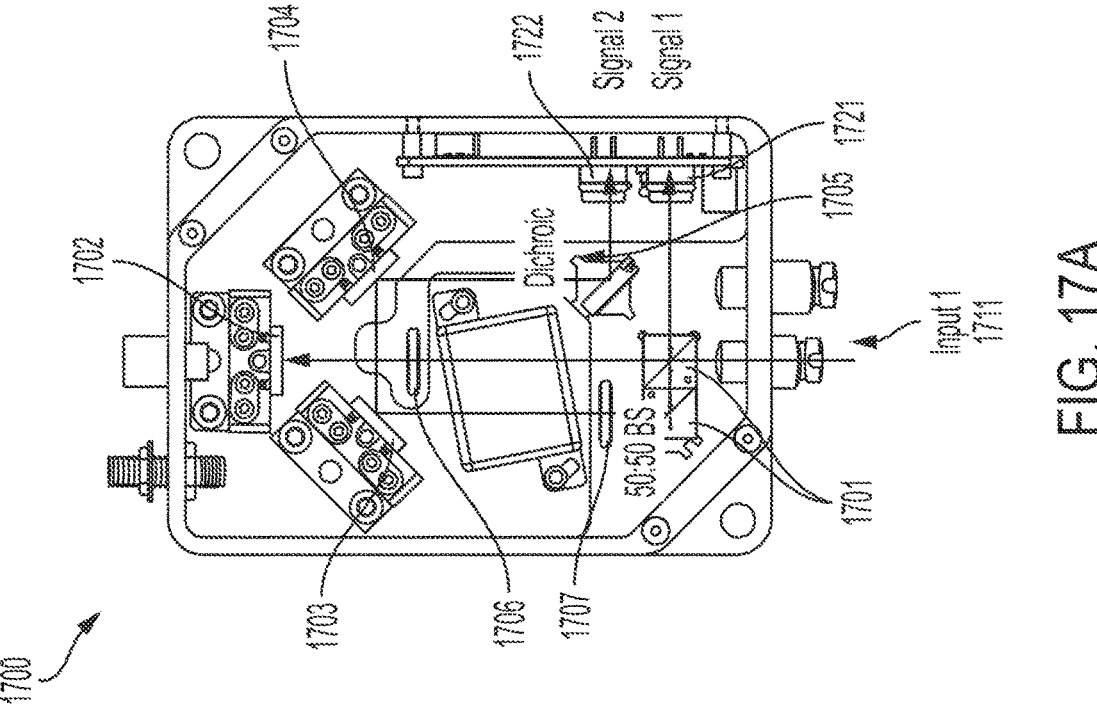

FIGS. 17A-17B show an illustrative locking device 1700 arranged in a rack-mountable housing, in accordance with some embodiments of the technology described herein. In the example of FIGS. 17A-17B, the same device is shown, but with different optical paths highlighted for purposes of illustration. Device 1700 is a unit that includes two input ports 1711 and 1712 for separate light inputs (e.g., laser light inputs, a portion of light from lasers 110 and 120). The device 1700 also includes photodetectors 1721 and 1722, which both receive light from the first input port, albeit after this light has been directed through optical components of the device as discussed below. Light input to the input port 1712 is not directly incident (or not incident at all) on either photodetector 1721 or 1722 and is used only to excite atoms in the vapor cell 1715 as in the example of FIG. 15 where laser 120 is used only to excite atoms in the vapor cell 1536.

As shown in FIG. 17A, in device 1700 light input through input port 1711 is split by the rightmost beamsplitter 1701. Some of the light then passes upwards through the vapor cell 1715, through attenuator 1706, reflected by mirror 1702 and reflected by the rightmost beamsplitter 1701 onto photodetector 1721. As a result, the photodetector 1721 produces a signal indicative of the extent to which light input to input port 1711 is locked to a desired wavelength corresponding to an excitation of the atoms in the vapor cell 1715. The other light input to input port 1711 is directed through attenuator 1707 and through the vapor cell 1715, then reflected by mirrors 1703 and 1704. This light is then incident on the dichroic mirror 1705, which is configured to reflect lower wavelength light (e.g., light expected to be input to port 1711) and transmit higher frequency light (e.g., light expected to be input to port 1712). This light is thereby reflected to the photodetector 1722.

As shown in FIG. 17B, light input through input port 1712 is transmitted through the dichroic mirror 1705, reflected by mirrors 1704 and 1703, then through the vapor cell 1715. Any light arriving on the other side of the vapor cell is attenuated by attenuator 1707 and/or directed into the wall of the device. This light can further excite atoms in the vapor cell 1715 as discussed above in relation to FIG. 15.

According to some embodiments, the device 400 may comprise one or more output ports that produce signals indicative of an amount of light that is incident upon the photodetectors 1721 and 1722 (e.g., a voltage signal for each photodetector).

According to some embodiments, the device 1700 may comprise one or more heating elements configured to heat the vapor cell 1715. In some embodiments, the device may also comprise circuitry to automatically regulate the temperature of the vapor cell at a fixed temperature. In some embodiments, the device may include an output to indicate a temperature of the vapor cell 1715 and an input that drives the one or more heating elements so that a device or system external to device 1700 may regulate the temperature of the vapor cell 1715. In some embodiments, the vapor cell 1715 may comprise one or more optically transparent windows. The windows may be parallel or may be skewed relative to one another.

III. Applications in Quantum Telecommunications

It is possible to entangle remote photons by "swapping" the entanglement between two or more entanglement sources. Entanglement distribution is important to universal quantum networking because the entanglement swapping process is the most rate-efficient approach to address exponential loss that occurs along fiber optics. The combination of all devices—quantum entanglement sources, quantum buffers, and entanglement swapping nodes—enabling and supporting the swapping process is known as a quantum repeater. The combination of these components can be used for many applications in communication and sensing, also providing technology-driven opportunities to enable new capabilities. Improved quantum repeater technologies will drive the implementation of high-data-rate, long-haul quantum communication networks and will enable the synchronized distribution of entanglement and quantum information beyond current limits imposed by fiber losses.

Conventionally, each quantum device of the quantum repeater is developed individually, regardless of their operating wavelengths (e.g., the quantum entanglement sources, quantum buffers, and entanglement swapping nodes may all operate at different wavelengths). Then, quantum frequency converters are used to change the wavelength of the photons to interface with optical fibers and the quantum devices of the quantum repeater. For example, many entanglement sources use nonlinear crystals to generate pairs of photons at wavelengths suitable for interfacing with optical fibers. Once the photon pairs have reached the other end of the optical fibers, the photons need to be converted to, for example, an NIR wavelength to be synchronized using an atomic-based quantum buffer. Although theoretically possible, there are several issues with an approach like this in practice.

First, frequency converters are lossy, especially at room temperatures. Overall photon conversion and transmission of systems including frequency converters is not likely to be greater than approximately 10%. Second, frequency converters are not the most cost-efficient solution because they typically require powerful pump lasers and/or complex filtering systems to eliminate the pump laser's residual effects. Finally, although frequency converters can address issues caused by wavelength-mismatch, the photons generated by a nonlinear crystal source can still be incompatible for interfacing with atomic, ionic or other photonic modules because of their large linewidth. For example, photons generated by nonlinear crystals usually have a linewidth on the order of 10 THz, which is significantly wider than any acceptable linewidth used by atomic or ionic devices such as quantum buffers, simulators and atomic processors. Quantum computers and sensors typically interact with photons possessing linewidths of few to tens of MHz.

The inventors have accordingly developed a quantum repeating scheme using a bichromatic photon source (e.g., bichromatic photon sources 100, 400, and/or 500 described herein) that provides an enhanced entanglement distribution rate by buffering and synchronizing the photons at each node while eliminating the need for frequency converters and heralding quantum memories. Additionally, this scheme keeps the telecom paths fully transparent by removing the atomic buffers off the fiber lines.

Figure 18A:
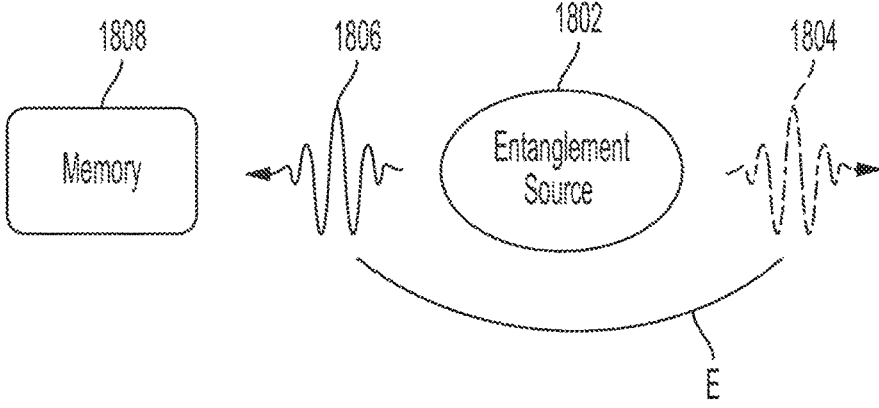
FIGS. 18A and 18B show a schematic block diagram of a bichromatic photon source and a quantum memory and an illustrative process of generating a bichromatic entangled photon pair and storing and transmitting photons of the pair, in accordance with some embodiments of the technology described herein.
Figure 18B:
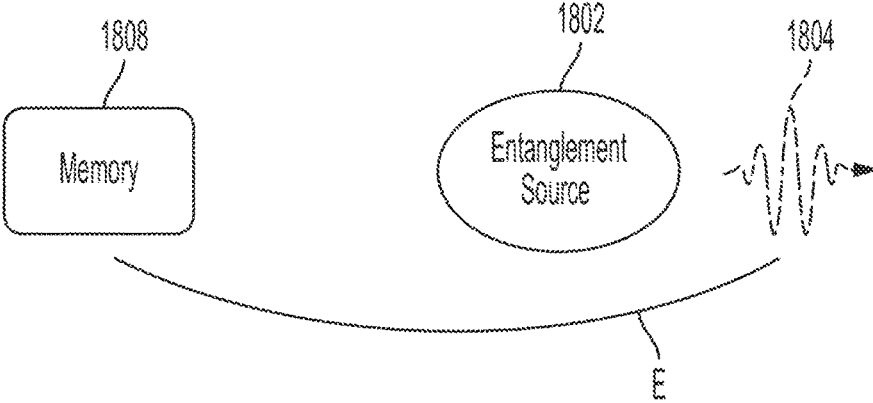

FIGS. 18A and 18B show a schematic block diagram of an entanglement source and a quantum memory and an illustrative process of generating a bichromatic entangled photon pair and storing and transmitting photons of the pair, in accordance with some embodiments of the technology described herein. The entanglement source 1802 may be any one of bichromatic photon sources 100, 400, or 500 or any suitable variations thereof and may be configured to generate a bichromatic entangled photon pair as described herein. The bichromatic entangled photon pair may include a first photon 1804 having a first frequency and a second photon 1806 having a second frequency. For example, the first photon 1804 may have a frequency in the infrared band and the second photon 1806 may have a frequency in the NIR band. The entanglement of the first photon 1804 and the second photon 1806 is indicated by the link E.

FIG. 18A shows the output of first photon 1804 and second photon 1806 from entanglement source 1802. Second photon 1806 may be directed towards quantum memory 1808. In some embodiments, the quantum memory 1808 may be a warm vapor-based quantum memory (e.g., warm rubidium vapor). However, it should be appreciated that the architecture described herein is not limited to warm vapor-based quantum memories.

In some embodiments, when second photon 1806 is stored in quantum memory 1808, the state of quantum memory 1808 may be newly entangled with first photon 1804, as shown by link E in the example of FIG. 18B. The first photon 1804 may then be transmitted away from entanglement source 1802 while maintaining entanglement with quantum memory 1808.

Figure 19A:
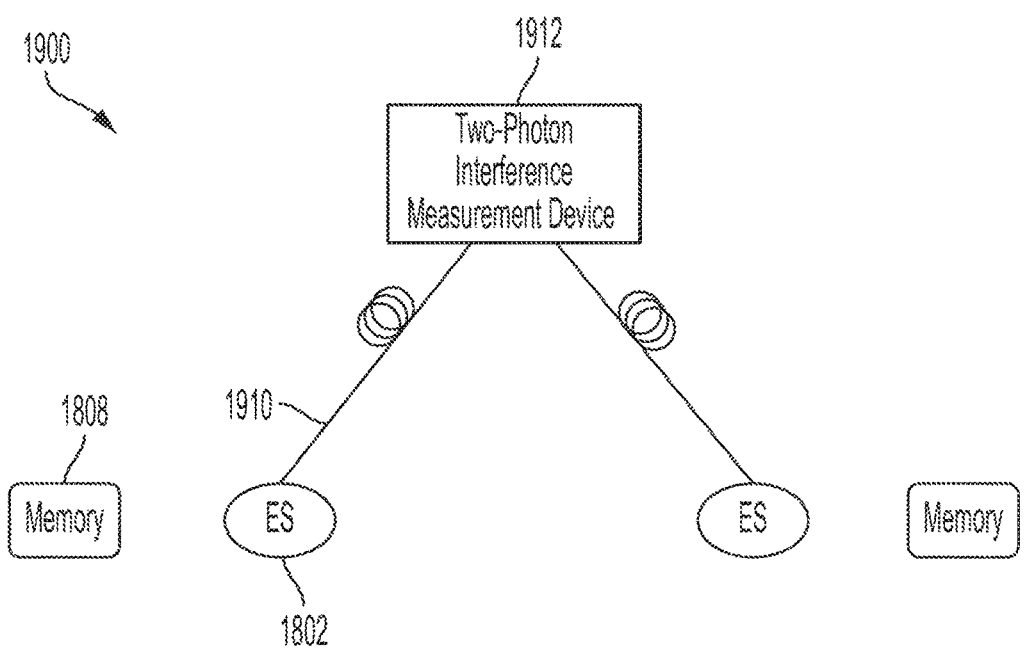
FIGS. 19A, 19B, and 19C show a schematic block diagram of a quantum network 1900 and an illustrative process of entangling stored photons within the quantum network 1900, in accordance with some embodiments of the technology described herein.
Figure 19B:
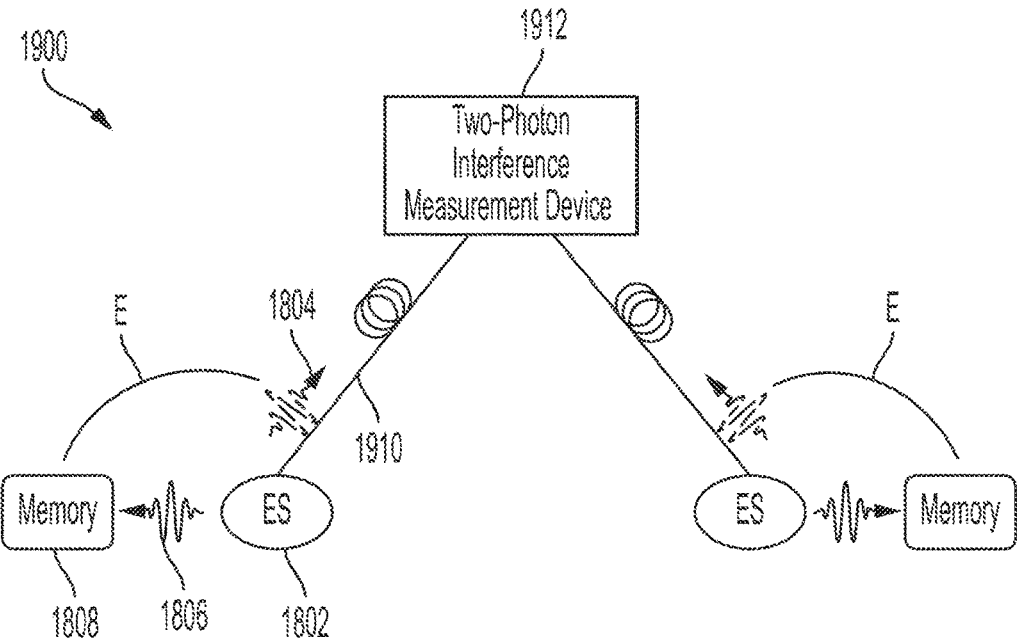
Figures 19C, 20A:
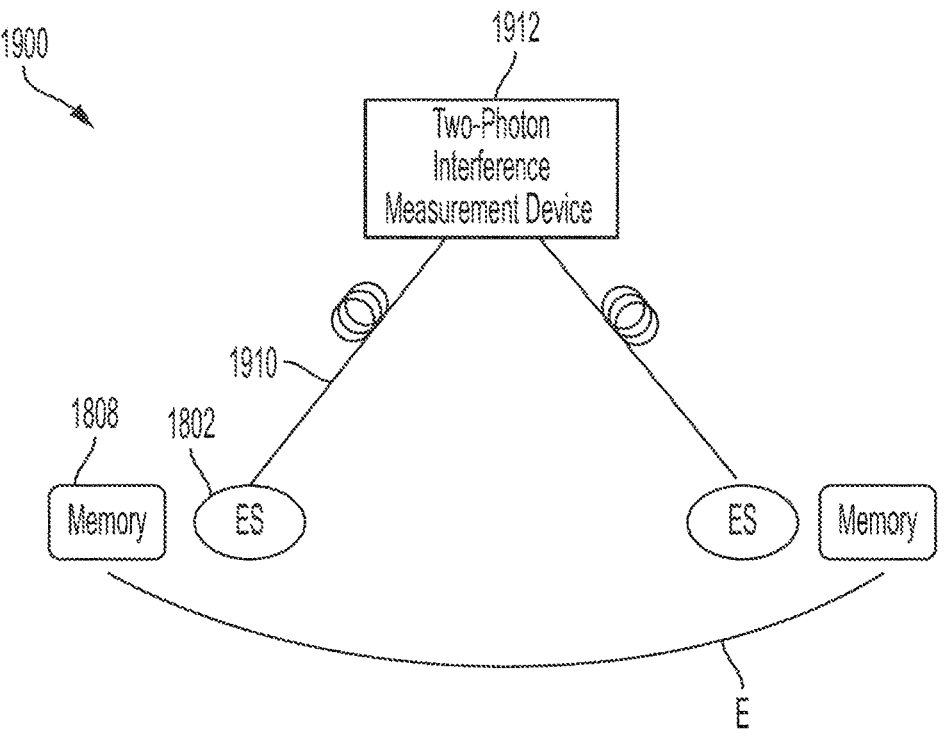
FIGS. 20A, 20B, 20C, and 20D show a schematic block diagram of a quantum network 2000 with multiple storage nodes and an illustrative process of entangling stored photons at end nodes of the quantum network 2000, in accordance with some embodiments of the technology described herein.

This functionality may be used to link remote quantum states through entanglement swapping. For example, FIGS. 19A, 19B, and 19C show a schematic block diagram of a quantum network 1900 and an illustrative process of entangling stored photons within the quantum network 1900, in accordance with some embodiments of the technology described herein. As shown in the example of FIG. 19A, pairs of entanglement sources 1802 and quantum memories are positioned at two different locations with physical distance between the locations.

In some embodiments, the entanglement sources 1802 may then generate bichromatic entangled pairs of photons, as shown in FIG. 19B. In some embodiments, the entanglement sources 1802 may generate the bichromatic entangled pairs of photons in response to a GPS-synchronized signal. After generating the bichromatic entangled pairs of photons, the first photons 1804 may be transmitted over optical fibers 1910 and the second photons 1806 may be stored in quantum memories 1808.

In some embodiments, the first photons 1804 may be transmitted to a two-photon interference measurement device 1912 at an intermediate location. The two-photon interference measurement device 1912 may be configured to perform a two-photon interference measurement upon receipt of transmitted photons. For example, the two-photon interference measurement device may be a Bell state measurement device configured to perform a Bell state measurement upon receipt of transmitted photons. Upon successful performance and notification of the two-photon interference measurement, a new entanglement may be formed between the quantum memories 1808, as shown by link E in the example of FIG. 19C. In this manner, quantum information may be transmitted over a distance using bichromatic entangled photon pairs.

Additional nodes may be added to a quantum network to increase the distances over which quantum information may be transmitted. FIGS. 20A, 20B, 20C, and 20D show a schematic block diagram of a quantum network 2000 with multiple storage nodes and an illustrative process of entangling stored photons at end nodes of the quantum network 2000, in accordance with some embodiments of the technology described herein. As shown in FIG. 20A, each entanglement source may generate a bichromatic entangled photon pair, transmitting the first photon 1804 over an optical fiber and storing the second photon 1806 (not shown) in quantum memories 1808. In some embodiments, the two entanglement sources 1802 disposed at an intermediate node may be replaced with a single entanglement source configured to produce two or more entangled bichromatic photon pairs using multiplexing techniques (e.g., as shown in the example of FIG. 4).

In some embodiments, upon receipt of the transmitted first photons 1804 at two-photon interference measurement devices 1912, two-photon interference measurements may be performed. The notification of results of the two-photon interference measurements may cause new entanglements between quantum memories 1808, as indicated by the links E in FIG. 20B.

Figure 20B:
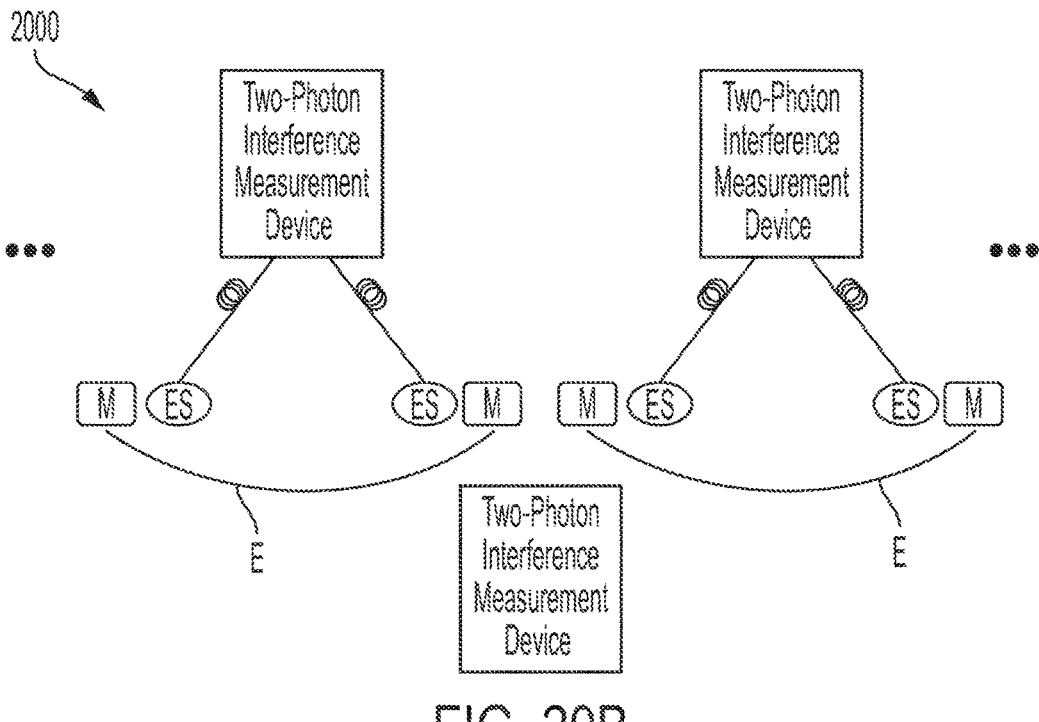
Figure 20C:
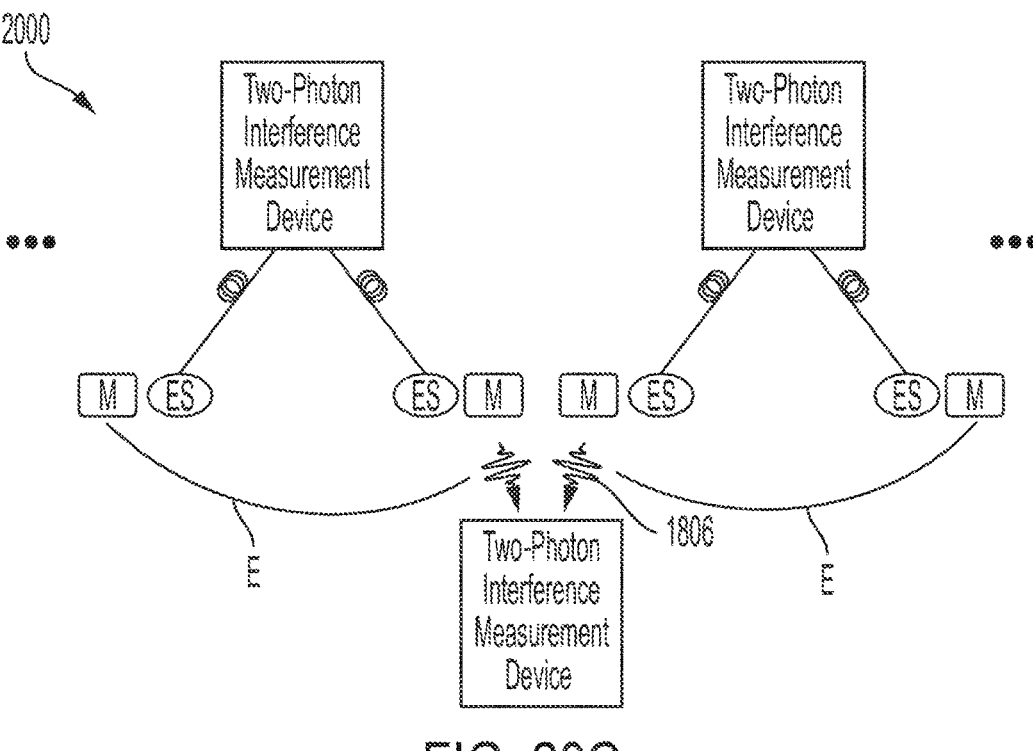
Figure 20D:
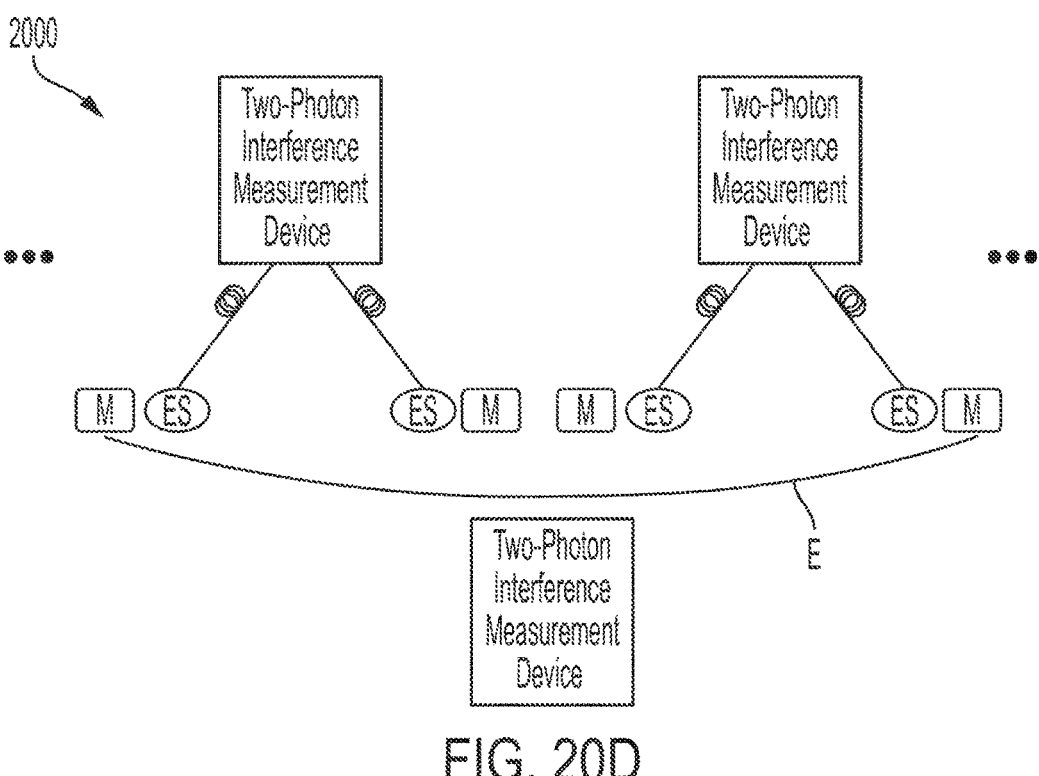

Thereafter, in some embodiments, intermediate second photons 1806 may be transmitted to another two-photon interference device 2014, as shown in the example of FIG. 20C. The transmitted second photons 1806 may be transmitted over free space, in some embodiments. The two-photon interference device 2014 may then perform a two-photon interference measurement to cause entanglement between quantum memories at end nodes of the network 2000, as shown in FIG. 20D.

Figure 21:
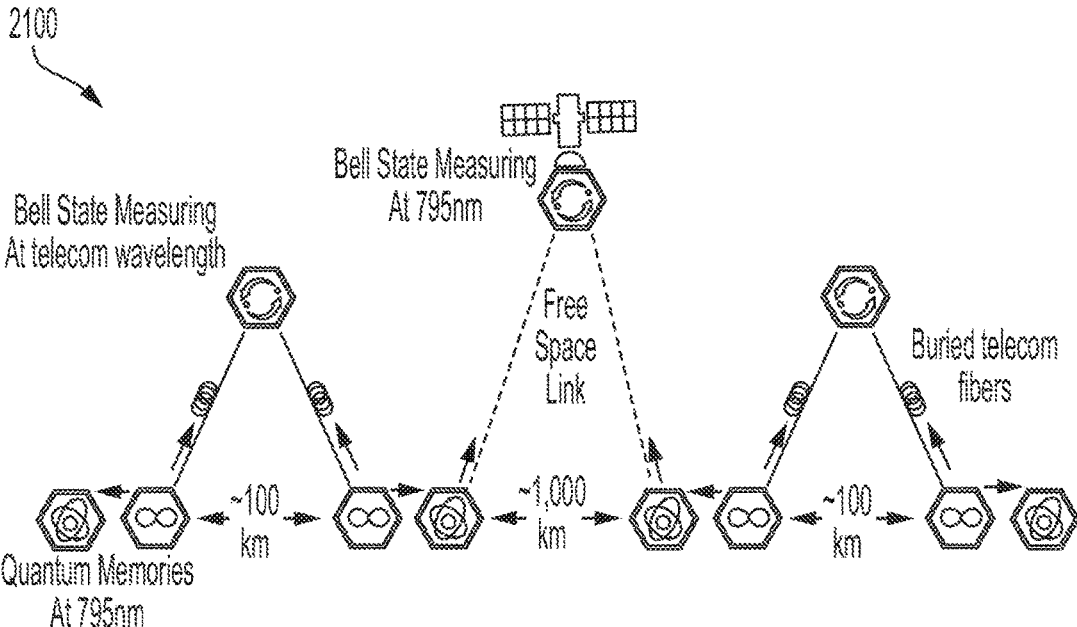
FIG. 21 shows an illustrative example of a quantum network 2100, in accordance with some embodiments of the technology described herein.

FIG. 21 shows an illustrative example of an implementation of a quantum network 2100, in accordance with some embodiments of the technology described herein. In the example of FIG. 21, blue components indicate communication via optical fiber and red components indicate communication via free space links.

In some embodiments, quantum network 2100 includes nodes at different locations, each node having an entanglement source and a quantum memory. The entanglement sources may be configured to generate bichromatic entangled photon pairs as described herein. First photons may be transmitted from the entanglement sources to Bell state measurement devices to entangle states of a portion of the quantum memories (e.g., as shown in the example of FIG. 20B). Entanglement of the quantum memories at end nodes of the network 2100 may then be performed by transmitting second photons over free space to another Bell state measurement device (e.g., at a mobile node such as a satellite, as shown in the example of FIG. 21).

Figure 22:
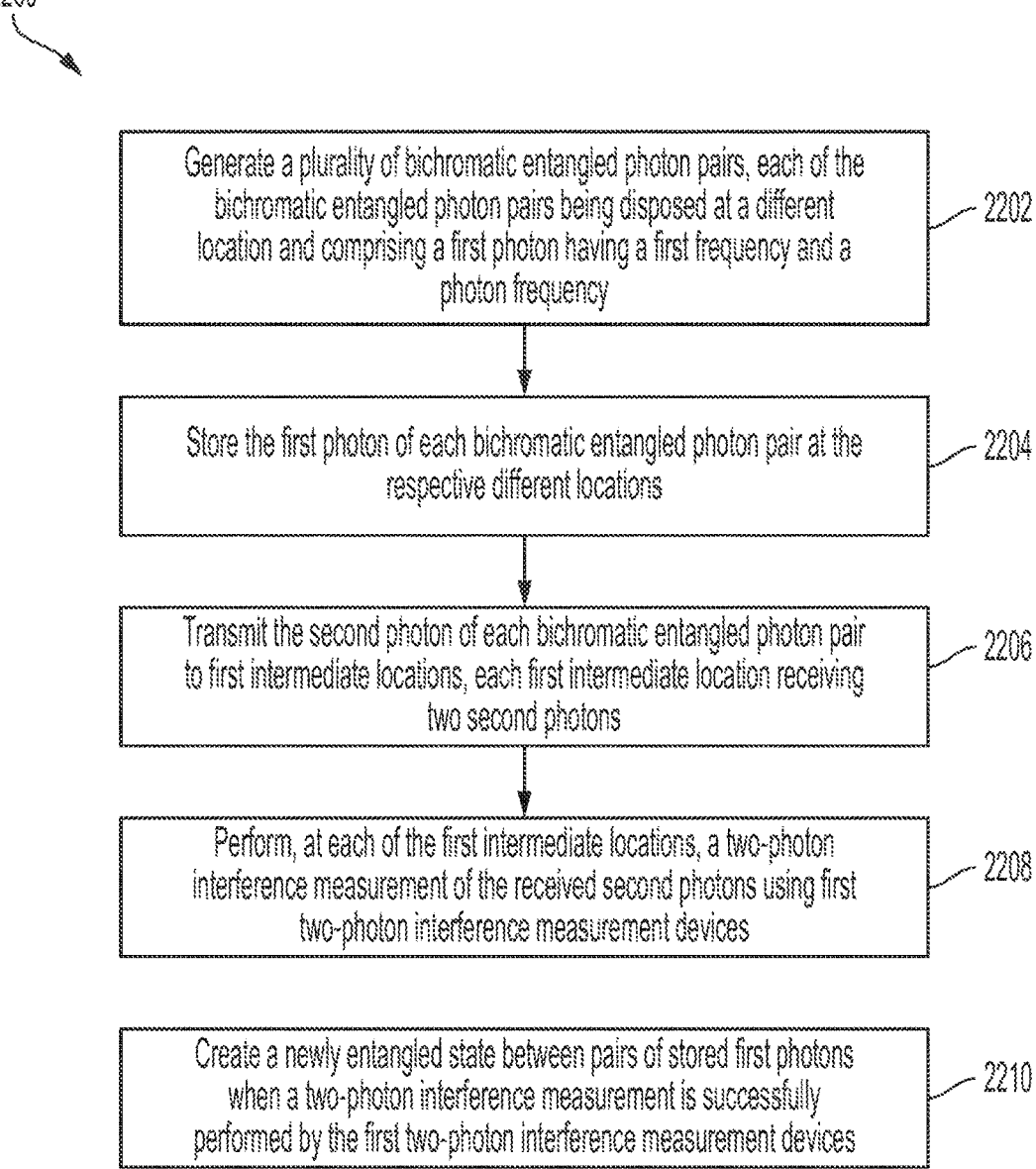
FIG. 22 is a flowchart describing a process 2200 for performing quantum networking, in accordance with some embodiments of the technology described herein.

FIG. 22 is a flowchart describing a process 2200 for performing quantum networking, in accordance with some embodiments of the technology described herein. Process 220 may begin at act 2202, in some embodiments. In act 2202, a plurality of bichromatic entangled photon pairs may be generated. For example, the bichromatic entangled photon pairs may be generated using any suitable bichromatic photon source, including bichromatic photon sources 100, 400, and/or 500 described herein.

In some embodiments, generating the plurality of bichromatic entangled photon pairs includes generating a first bichromatic entangled photon pair using a first device located at a first location and generating a second bichromatic entangled photon pair using a second device disposed at a second location different than the first location. For example, a first bichromatic photon source may generate the first bichromatic entangled photon pair at location A, and a second bichromatic photon source may generate the second bichromatic entangled photon pair at location B. Location A may be located a distance (e.g., kilometers) away from location B. The generation of bichromatic entangled photon pairs may be repeated at locations C, D, E, etc.

After act 2202, process 2200 may proceed to act 2204, in some embodiments. In act 2204, a first photon of each bichromatic photon pair may be stored at their respective locations. For example, a first photon of the first bichromatic entangled photon pair may be stored in a quantum memory at location A and a first photon of the second bichromatic entangled photon pair may be stored in a quantum memory at location B. Additional aspects of suitable quantum memory devices are described in U.S. Patent Application Publication No. 2021/0105135, titled "Quantum Network Devices, Systems, and Methods," filed on Oct. 1, 2020, which is incorporated by reference herein in its entirety.

After act 2204, process 2200 may proceed to act 2206, in some embodiments. In act 2206, a second photon of each bichromatic entangled photon pair may be transmitted to first intermediate locations. The first intermediate locations are spatially separated from the locations (e.g., locations A, B, C, etc.) of the bichromatic photon sources used to generate the plurality of bichromatic entangled photon pairs. For example, and as shown in FIG. 21 herein, the second photons of each bichromatic entangled photon pair may be transmitted over optical fiber to the first intermediate locations. In some embodiments, the second photon may be transmitted after the quantum node receives a timing signal from a GPS-synchronized device.

After act 2206, process 2200 may proceed to act 2208, in some embodiments. In act 2208, two-photon interference measurements may be performed at each of the first intermediate locations. The two-photon interference measurements may be performed using two-photon interference measurement devices. For example, the two-photon interference measurements may be Bell-state measurements performed by Bell-state measurement devices.

After act 2208, process 2200 may proceed to act 2210, in some embodiments. In act 2210, states of pairs of stored first photons may be entangled to form a newly-entangled photon pair. The pairs of stored first photons may be entangled by the successful performance of the two-photon interference measurements on the second photons transmitted to the first intermediate locations. In this manner, entanglements can be "swapped" between pairs of first and second photons to being between pairs of first photons stored in quantum memories.

In some embodiments, process 2200 may further include transmitting, to a second intermediate location and a second two-photon interference measurement device at the second intermediate location, one of the stored first photons of the entangled pairs of first photons. At each of the second intermediate locations, a two-photon interference measurement may be performed using the received first photons and the second two-photon interference measurement devices. Upon successfully performing the second two-photon interference measurements, a newly entangled state may be created between different pairs of stored first photons. In this manner, the quantum entanglements may be swapped from first pairs of first photons (e.g., pairs of first photons disposed in nearest-neighbor locations) to second pairs of first photons (e.g., pairs of first photons disposed in next-nearest neighbor locations).

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively. The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

The terms "approximately" and "about" may be used to mean within ±20% of a target value in some embodiments, within ±10% of a target value in some embodiments, within ±5% of a target value in some embodiments, and/or within ±2% of a target value in some embodiments. The terms "approximately" and "about" may include the target value.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only. What is claimed is:

What is claimed is:

1. A device for generating an entangled pair of photons, the device comprising:
a first atomic vapor cell disposed within beam paths of a first laser beam and a second laser beam, the first atomic vapor cell comprising atoms of an atomic species configured to generate the entangled pair of photons in response to excitations caused by photons of the first laser beam and the second laser beam, wherein:
the atomic species comprises a first atomic transition and a second atomic transition,
the first laser beam has a first wavelength,
the second laser beam has a second wavelength, the second wavelength being different than the first wavelength, and
the first and second wavelengths satisfy conditions for a four-wave mixing process in the first atomic vapor cell, the four-wave mixing process causing generation of the entangled pair of photons, the entangled pair of photons comprising a first photon having a third wavelength and a second photon having a fourth wavelength, the first wavelength being approximately 795 nm and the second wavelength being approximately 1324 nm or approximately 1449 nm.

2. The device of claim 1, wherein photons of the entangled pair of photons have a photon linewidth in a range from 10 MHz to 500 MHz.

3. The device of claim 1, wherein the device is configured to generate the entangled pair of photons with a spectral brightness in a range from 20 s$^{-1}$/MHz to 200 s$^{-1}$/MHz.

4. The device of claim 1, wherein the device further comprises a Fabry-Perot etalon disposed in a beam path of the first photon and/or the second photon.

5. The device of claim 1, wherein the entangled pair of photons comprises a first photon and a second photon, and wherein the device further comprises a dichroic mirror disposed in a beam path of the first photon and/or the second photon.

6. The device of claim 1, further comprising:
a first laser configured to generate the first laser beam; and
a second laser configured to generate the second laser beam.

7. The device of claim 6, further comprising at least one acousto-optic deflector (AOD) positioned between the first and second lasers and the first atomic vapor cell, the at least one AOD configured to deflect the first and second laser beams to create a spatial pattern along at least one axis.

8. The device of claim 1, wherein:
the first laser beam and the second laser beam intersect at a location within the first atomic vapor cell.

9. The device of claim 8, wherein:

the first laser beam is arranged to enter the first atomic vapor cell along a first direction perpendicular to a face of the first atomic vapor cell, and the second laser beam is arranged to enter the first atomic vapor cell along a second direction, the second direction being defined by an angle greater than 0° and less than or equal to 5° between the first direction and the second direction.

10. The device of claim 1, further comprising a locking device for locking an output of a first laser to the first wavelength and an output of a second laser to the second wavelength.

11. The device of claim 10, wherein the locking device comprises:

a first laser input port coupled to an output of the first laser;

a second laser input port coupled to an output of the second laser;

a second atomic vapor cell arranged to receive a portion of the first laser beam input to the first laser input port and to receive a portion of the second laser beam input to the second laser input port;

a first photodetector arranged to receive the portion of the first laser beam after the portion passes through the second atomic vapor cell; and a second photodetector arranged to receive the portion of the second laser beam after the portion passes through the second atomic vapor cell.

12. The device of claim 11, wherein the locking device further comprises a dichroic mirror configured to:

reflect the portion of the first laser beam onto the first photodetector after the portion passes through the second atomic vapor cell, and transmit the portion of the second laser beam.

13. The device of claim 11, wherein the locking device further comprises one or more beamsplitter components configured to:

split the portion of the first laser beam into a first beam and a second beam, direct the first beam into a first region of the second atomic vapor cell, direct the second beam into a second region of the second atomic vapor cell, and direct the first beam onto the first photodetector after the first beam passes through the first region of the second atomic vapor cell.

14. The device of claim 13, wherein the locking device further comprises one or more mirrors configured to direct the second beam onto the second photodetector after the second beam passes through the second region of the second atomic vapor cell.

15. A method of generating an entangled pair of photons, the method comprising:

generating a first laser beam using a first laser, the first laser beam having a first wavelength;

generating a second laser beam using a second laser, the second laser beam having a second wavelength different than the first wavelength;

causing a four-wave mixing process in a first atomic vapor cell containing an atomic vapor of an atomic species by passing the first laser beam and the second laser beam through the first atomic vapor cell; and generating, as a result of the four-wave mixing process, the entangled pair of photons, wherein:

generating the entangled pair of photons comprising generating a first photon having a third wavelength and a second photon having a fourth wavelength, the first wavelength being approximately 795 nm and the second wavelength being approximately 1324 nm or approximately 1449 nm.

16. The method of claim 15, wherein:

generating the first laser beam comprises generating the first laser beam having the first wavelength, the first wavelength being approximately 780 nm, and generating the second laser beam comprises generating the second laser beam having the second wavelength, the second wavelength being approximately 1367 nm or approximately 1529 nm.

17. The method of claim 15, wherein generating the entangled pair of photons comprises generating an entangled pair of photons have a photon linewidth in a range from 10 MHz to 100 GHz and/or with a spectral brightness in a range from 20 $s^{-1}$/MHz to 200 $s^{-1}$/MHz.

18. The method of claim 15, wherein passing the first laser beam and the second laser beam through the first atomic vapor cell comprises:

passing the first laser beam through the first atomic vapor cell along a first direction perpendicular to a face of the first atomic vapor cell, and passing the second laser beam through the first atomic vapor cell along a second direction, the second direction being defined by an angle greater than 0° and less than or equal to 5° between the first direction and the second direction.

19. The method of claim 15, further comprising locking the first laser beam to the first wavelength and the second laser beam to the second wavelength by:

directing a portion of light from the first laser beam through a second atomic vapor cell and onto a first photodetector and onto a second photodetector;

directing a portion of light from the second laser beam through the second atomic vapor cell;

locking the first laser beam at the first wavelength based on signals produced by the first photodetector indicating an amount of attenuation of the portion of light from the first laser beam by atoms of the second atomic vapor cell at a characteristic transition frequency; and locking the second laser beam at the second wavelength based on signals produced by the second photodetector indicating an amount of attenuation of the portion of light from the first laser beam by atoms of the second atomic vapor cell at the characteristic transition frequency.

20. The method of claim 19, wherein locking the first laser beam at the first wavelength comprises modulating a voltage input to the first laser and measuring a first error signal generated based on the signals produced by the first photodetector.

21. The method of claim 20, wherein locking the second laser beam at the second wavelength comprises identifying a voltage input to the second laser that causes a greater attenuation of the signals produced by the second photodetector.

22. The method of claim 19, wherein the portion of light from the first laser beam is unpolarized, and wherein the portion of light from the second laser beam is unpolarized.

23. The method of claim 19, wherein the portion of light from the second laser beam is not incident on either the first or second photodetectors.

24. The method of claim 19, wherein the portion of light from the first laser beam is directed through first and second regions of the second atomic vapor cell, and wherein the portion of light from the second laser beam is directed through the first region but not the second region of the second atomic vapor cell.

* * * * *